(12) United States Patent
Tsai et al.

(10) Patent No.: US 8,379,325 B2
(45) Date of Patent: Feb. 19, 2013

(54) PHOTOGRAPHING OPTICAL LENS ASSEMBLY

(75) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/301,440

(22) Filed: Nov. 21, 2011

(65) Prior Publication Data
US 2013/0021678 A1 Jan. 24, 2013

(30) Foreign Application Priority Data
Jul. 22, 2011 (TW) ................................ 00126083 A

(51) Int. Cl.
*G02B 13/18* (2006.01)
*G02B 9/60* (2006.01)

(52) U.S. Cl. ........ 359/714; 359/740; 359/763; 359/764; 359/766

(58) Field of Classification Search .................. 359/714, 359/740, 763, 764, 766
See application file for complete search history.

(56) References Cited

U.S. PATENT DOCUMENTS

| 7,365,920 | B2 | 4/2008 | Noda | |
|---|---|---|---|---|
| 8,179,615 | B1* | 5/2012 | Tang et al. | 359/714 |
| 2010/0253829 | A1* | 10/2010 | Shinohara | 348/340 |
| 2011/0249348 | A1* | 10/2011 | Kubota et al. | 359/764 |
| 2012/0069455 | A1* | 3/2012 | Lin et al. | 359/714 |
| 2012/0087019 | A1* | 4/2012 | Tang et al. | 359/714 |

* cited by examiner

*Primary Examiner* — Evelyn A. Lester
(74) *Attorney, Agent, or Firm* — Maschoff Gilmore & Israelsen

(57) ABSTRACT

An photographing optical lens assembly includes, in order from an object side to an image side, a first lens element with positive refractive power, a second lens element with negative refractive power having a concave object-side surface and a concave image-side surface, a plastic third lens element with positive refractive power having a concave aspheric object-side surface and a convex aspheric image-side surface, a plastic fourth lens element with negative refractive power having a concave aspheric object-side surface and a convex aspheric image-side surface and a plastic fifth lens element having an aspheric object-side surface and an aspheric image-side surface. By adjusting the focal lengths of the second and the fourth lens element and the photographing optical lens assembly, and the curvature radii of the object-side and the image-side surface of the second lens element, the photographing optical lens assembly is miniaturized, and the image quality is improved.

19 Claims, 12 Drawing Sheets

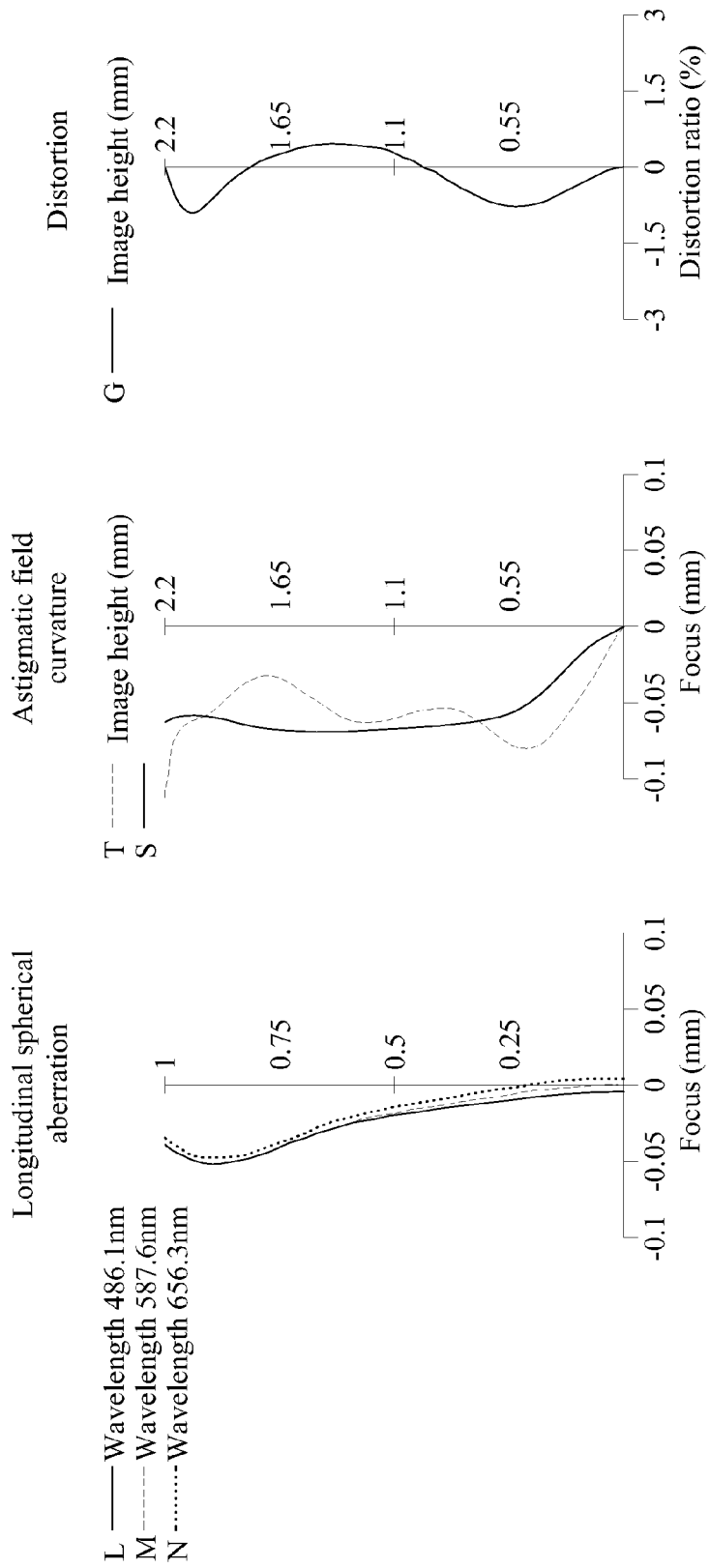

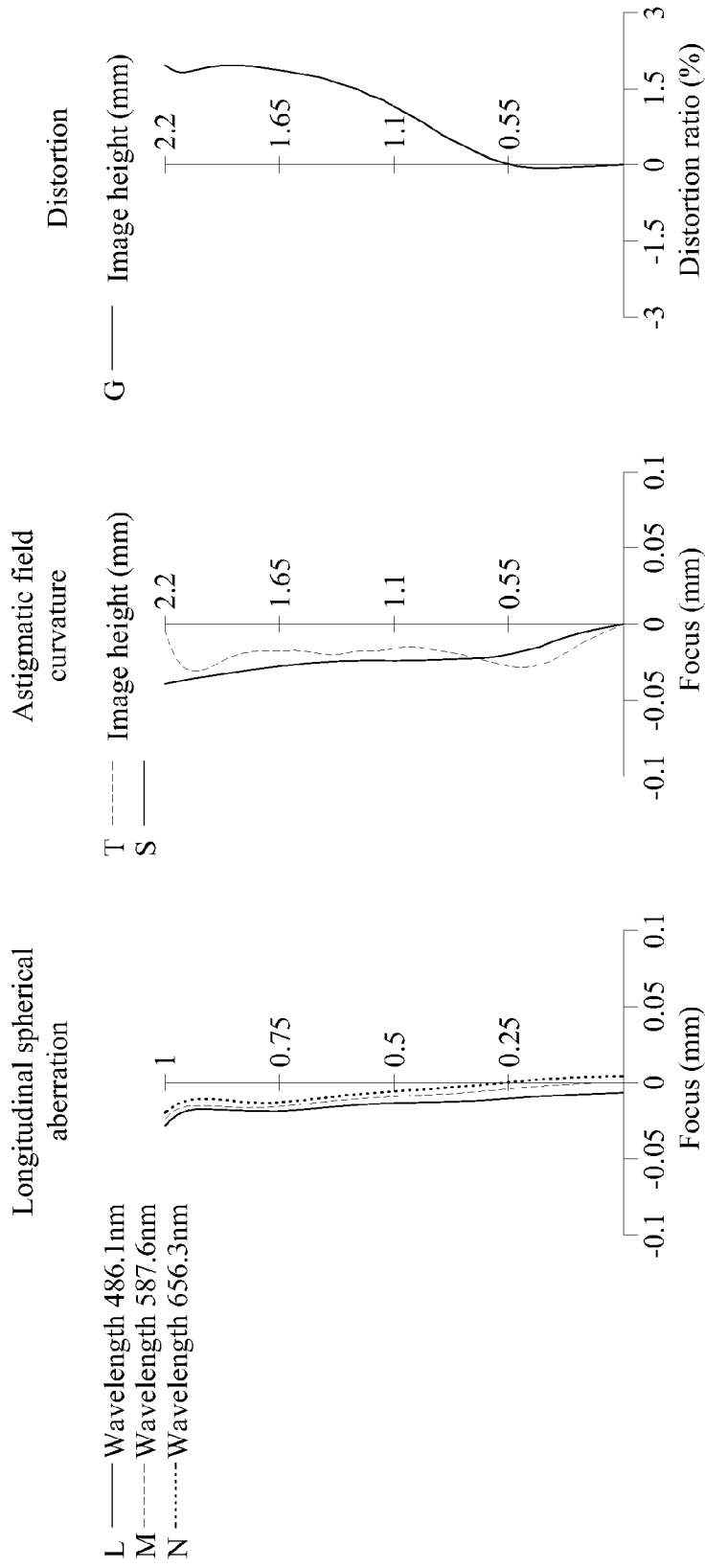

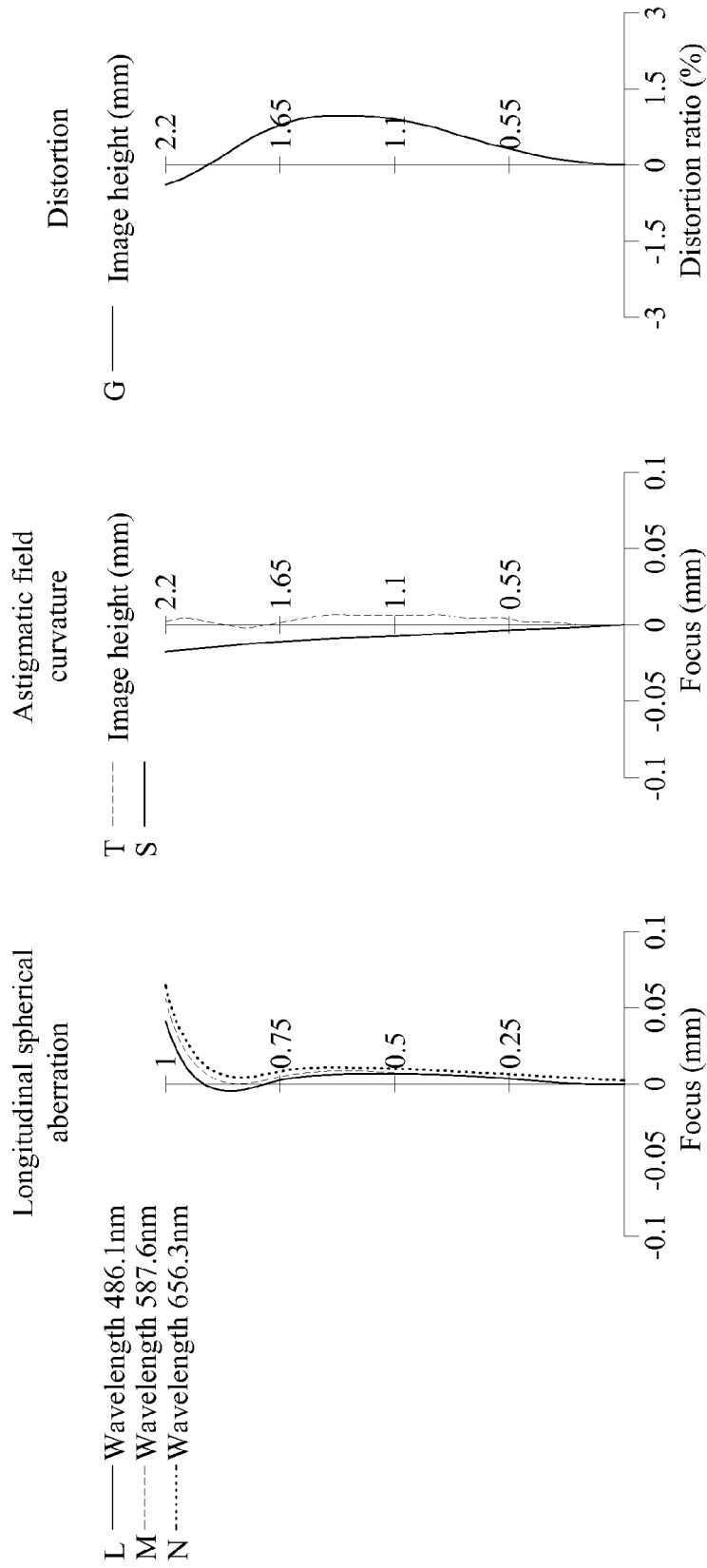

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 100126083 filed in Taiwan, R.O.C. on Jul. 22, 2011, the entire contents of which are hereby incorporated by reference.

BACKGROUND

1. Technical Field

The present disclosure relates to a photographing optical lens assembly, and more particularly to a photographing optical lens assembly having multiple lens.

2. Related Art

In recent years, with the prosperity of the mobile electronic devices having image-taking function, demands for compact photographing cameras increase exponentially. The photo-sensing device, e.g. a sensor, of an ordinary photographing camera is commonly selected from a charge coupled device (CCD) and a complementary metal-oxide semiconductor (CMOS) device. In addition, with the advance in semiconductor manufacturing technology enabling the miniaturization of pixel size of sensors, people gradually attach importance to improving the image quality of the miniaturized lens assembled in limited spaces.

A conventional compact photographing lens used in a mobile electronic device, such as the compact photographing lens disclosed in U.S. Pat. No. 7,365,920, usually consists of four lens elements. However, with the rising popularity of high technology mobile devices including Smart Phone, and PDA (Personal Digital Assistant), the demand for the compact high-level photographing lens with better resolution and image quality increases rapidly, and the conventional four lens assembly can not meet such demand of the high-level photographing lens assembly. With the electronic devices heading towards the direction of high performance while being as small and light as possible, the inventors recognize that an optical imaging system capable of improving the image quality of mobile electronic devices as well as miniaturizing the overall size of the camera lens equipped therewith is urgently needed.

SUMMARY

According to an embodiment, a photographing optical lens assembly comprises, in order from an object side to an image side: a first lens element with positive refractive power, a second lens element with negative refractive power having a concave object-side surface and a concave image-side surface, a third lens element with positive refractive power having a concave object-side surface and a convex image-side surface, a fourth lens element with negative refractive power having a concave object-side surface and a convex image-side surface and a fifth lens element. The object-side surfaces and the image-side surfaces of the third lens element, fourth lens element and the fifth lens element are aspheric, and the third lens element, fourth lens element and the fifth lens element are made of plastic.

There is an air distance between the first lens element and the second lens element, and the photographing optical lens assembly satisfies the following conditions:

$-1.4 < f/f_2 < -0.3$  (Condition 1)

$-1.5 < f/f_4 < -0.2$  (Condition 2)

$-0.6 < (R_3 + R_4)/(R_3 - R_4) < 1.0$  (Condition 3)

Wherein f is the focal length of the photographing optical lens assembly; $f_2$ is the focal length of the second lens element; $f_4$ is the focal length of the fourth lens element; $R_3$ is the curvature radius of the object-side surface of the second lens element; $R_4$ is the curvature radius of the image-side surface of the second lens element.

According to another embodiment, a photographing optical lens assembly comprises, in order from an object side to an image side: a first lens element with positive refractive power; a second lens element with negative refractive power having a concave object-side surface and a concave image-side surface; a third lens element having a concave object-side surface and a convex image-side surface; a fourth lens element with negative refractive power having a concave object-side surface and a convex image-side surface, and a fifth lens element. The object-side surfaces and the image-side surfaces of the third lens element, fourth lens element and the fifth lens element are aspheric. The third lens element, fourth lens element and the fifth lens element are made of plastic.

The photographing optical lens assembly satisfies the following condition:

$-14.0 < (R_7 + R_8)/(R_7 - R_8) < -2.0$  (Condition 4)

$0 < T_{12}/T_{23} < 1.4$  (Condition 5)

$20 < V_1 - V_2 < 45$  (Condition 6)

Wherein $T_{12}$ is the axial distance between the first lens element and the second lens element; $T_{23}$ is the axial distance between the second lens element and the third lens element; f is the focal length of the photographing optical lens assembly; $f_4$ is the focal length of the fourth lens element; $R_7$ is the curvature radius of the object-side surface of the fourth lens element; $R_8$ is the curvature radius of the image-side surface of the fourth lens element; $V_1$ is the Abbe number of the first lens element, and $V_2$ is the Abbe number of the second lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 2B is a graph of longitudinal spherical aberration curves when the lights having wavelengths of 486.1 nm, 587.6 nm, and 656.3 nm are respectively projected in the photographing optical lens assembly in FIG. 2A;

FIG. 2C is a graph of astigmatic field curves when the light having the wavelength of 587.6 nm is projected in the photographing optical lens assembly in FIG. 2A;

FIG. 2D is a graph of a distortion curve when the light having the wavelength of 587.6 nm is projected in the photographing optical lens assembly;

FIG. 3B is a graph of longitudinal spherical aberration curves when the lights having wavelengths of 486.1 nm, 587.6 nm, and 656.3 nm are respectively projected in the photographing optical lens assembly in FIG. 3A;

FIG. 3C is a graph of astigmatic field curves when the light having the wavelength of 587.6 nm is projected in the photographing optical lens assembly in FIG. 3A;

FIG. 3D is a graph of a distortion curve when the light having the wavelength of 587.6 nm is projected in the photographing optical lens assembly in FIG. 3A;

FIG. 4B is a graph of longitudinal spherical aberration curves when the lights having wavelengths of 486.1 nm, 587.6 nm, and 656.3 nm are respectively projected in the photographing optical lens assembly in FIG. 4A;

FIG. 4C is a graph of astigmatic field curves when the light having the wavelength of 587.6 nm is projected in the photographing optical lens assembly in FIG. 4A;

FIG. 4D is a graph of a distortion curve when the light having the wavelength of 587.6 nm is projected in the photographing optical lens assembly in FIG. 4A;

DETAILED DESCRIPTION

Figure 1A:
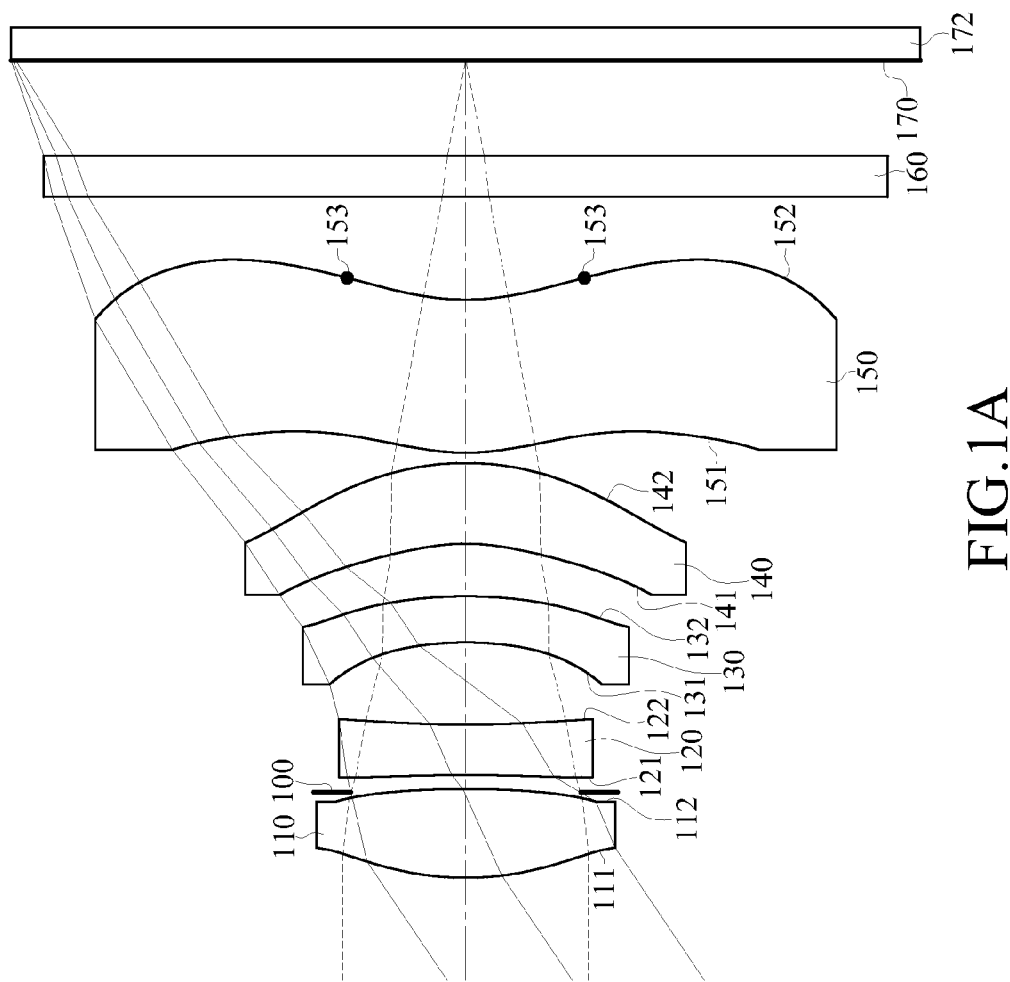
FIG. 1A is a schematic structural view of a first embodiment of a photographing optical lens assembly.

The photographing optical lens assembly of the present disclosure is described by taking FIG. 1A as an example, to illustrate that the embodiments have similar lens combinations, configuration relationships, and the same conditions of the optical lens assembly. The differences are described in detail in the following embodiments other than the embodiment described in FIG. 1.

Taking FIG. 1A as an example, the photographing optical lens assembly 10 comprises, from an object side to an image side along an optical axis (from left to right in FIG. 1A) in sequence, a first lens element 110, a second lens element 120, a third lens element 130, a fourth lens element 140, a fifth lens element 150, a infrared filter 160 and a image sensor 172 disposed on an image plane 170.

The refractive power of the first lens element 110 is positive, so the first lens element 110 provides part of the refractive power needed by the photographing optical lens assembly 10, and, therefore, helps reduce the total optical length of the photographing optical lens assembly 10. The first lens element 110 comprises an object-side surface 111 and an image-side surface 112. When the object-side surface 111 is convex, the positive refractive power of the first lens element 110 can be enhanced, and therefore, the total optical length of the photographing optical lens assembly 10 is further reduced.

The second lens element 120 comprises an object-side surface 121 and an image-side surface 122. The refractive power of the second lens element 120 is negative and both the object-side surface 121 and an image-side surface 122 are concave, so the aberration of the photographing optical lens assembly 10 is corrected.

The third lens element 130 comprises an object-side surface 131 and an image-side surface 132. The third lens element 130 has negative refractive power, the object-side surface 131 is concave and the image-side surface 132 is convex, so the sensitivity of the photographing optical lens assembly 10 is reduced, and the astigmatism of the photographing optical lens assembly 10 is corrected.

The fourth lens element 140 comprises an object-side surface 141 and an image-side surface 142. When the fourth lens element 140 has negative refractive power, the object-side surface 141 is concave, and the image-side surface 142 is convex, the high order aberration is corrected.

The fifth lens element 150 comprises an object-side surface 151 and an image-side surface 152. The image-side surface 152 of the fifth lens element 150 is concave, so the principle point of the photographing optical lens assembly 10 is away from the image plane 170, and therefore, the photographing optical lens assembly 10 is miniaturized. Furthermore, the fifth lens element 150 includes at least one inflection point 153 for reducing the angle of incidence on the image sensor 172 from the off-axis field and the off-axis aberration.

If the third lens element 330 has positive refractive power, the object-side surface 331 is concave and the image-side surface 332 is convex, the positive refractive power of the photographing optical lens assembly 30 is well-distributed, the sensitivity of the photographing optical lens assembly 30 is reduced, and the astigmatism of the photographing optical lens assembly 30 is corrected. In addition, the fourth lens element 340 having negative refractive power forms a telephoto structure with the third lens element 330 having positive refractive power, so the total optical length of the photographing optical lens assembly 30 is shortened.

The photographing optical lens assembly 10 satisfies the following conditions.

$$-1.4 < f/f_2 < -0.3 \quad \text{(Condition 1)}$$

$$-1.5 < f/f_4 < -0.2 \quad \text{(Condition 2)}$$

$$-0.6 < (R_3 + R_4)/(R_3 - R_4) < 1.0 \quad \text{(Condition 3)}$$

$-14.0 < (R_7+R_8)/(R_7-R_8) < -2.0$ (Condition 4)

$0 < T_{12}/T_{23} < 1.4$ (Condition 5)

$20 < V_1-V_2 < 45$ (Condition 6)

Wherein f is the focal length of the photographing optical lens assembly 10; $f_2$ is the focal length of the second lens element 120; $f_4$ is the focal length of the fourth lens element 140; $R_3$ is the curvature radius of the object-side surface 121; $R_4$ is the curvature radius of the image-side surface 122; $R_7$ is the curvature radius of the object-side surface 141; $R_8$ is the curvature radius of the image-side surface 142; $V_1$ is the Abbe number of the first lens element 110, and $V_2$ is the Abbe number of the second lens element 120; $T_{12}$ is the axial distance between the first lens element 110 and the second lens element 120; $T_{23}$ is the axial distance between the second lens element 120 and the third lens element 130.

The satisfaction of the condition 1 is favorable for the correction of the chromatism and aberration of the photographing optical lens assembly 10. The satisfaction of the condition 2 is favorable for the correction of the high order aberration of the photographing optical lens assembly 10. In some embodiments, the photographing optical lens assembly 10 further satisfies a stricter condition: $-0.6 < f/f_4 < -0.2$.

The satisfaction of the condition 3 is favorable for correction of the astigmatism of the photographing optical lens assembly 10. In some embodiments, the photographing optical lens assembly 10 further satisfies a stricter condition: $0 < (R_3+R_4)/(R_3-R_4) < 1.0$. When the condition 4 is satisfied, the curvature radiuses of the object-side surface 141 and the image-side surface 142 is so proper that the aberration of the photographing optical lens assembly 10 is reasonable. In some embodiments, the photographing optical lens assembly 10 further satisfies a stricter condition: $-7.5 < (R_7+R_8)/(R_7-R_8) < -3.0$.

When the condition 5 is satisfied, distance between any two of the first lens element 110, second lens element 120 and the third lens element 130 is proper, so the angle at which the light is incident on the image sensor 172 is reduced, and the reduced angle is favorable for correcting the off-axis aberration. In some embodiments, the photographing optical lens assembly 10 satisfies a stricter condition: $0 < T_{12}/T_{23} < 0.5$. The satisfaction of the condition 6 is favorable for correcting the chromatism of the photographing optical lens assembly 10. In some embodiments, the photographing optical lens assembly 10 satisfies a stricter condition: $30 < V_1-V_2 < 42$.

In some embodiments, besides condition 1 to condition 6, the photographing optical lens assembly 10 further satisfies following conditions:

$1.2 < f/f_1 < 2.0$ (Condition 7)

$-0.5 < f/f_3 + f/f_4 + f/f_5 < 0.3$ (Condition 8)

$TTL/ImgH < 2.1$ (Condition 9)

Wherein, $f_1$ is the focal length of the first lens element 110; $f_3$ is the focal length of the third lens element 130; $f_5$ is the focal length of the fifth lens element 150; TTL is the axial distance between the object-side surface 111 and the image plane 170; ImgH is half of the diagonal length of the effective photosensitive area of the image sensor 172.

The satisfaction of the condition 7 helps the first lens element 110 has proper positive refractive power, and, therefore, is favorable for shortening the total optical length of the photographing optical lens assembly 10. The satisfaction of the condition 8 balances the refractive powers of the third lens element 130, the fourth lens element 140 and the fifth lens element 150 with each other, so the condition 10 is favorable for the correction of the aberration of the photographing optical lens assembly 10. The satisfaction of the condition 9 is favorable for the miniaturization of the photographing optical lens assembly 10.

In some embodiments, the third lens element 130, the fourth lens element 140 and the fifth lens element 150 are made of plastic for reducing the production cost. Besides, in some embodiments, the surfaces of the third lens element 130, the fourth lens element 140 and the fifth lens element 150 are aspheric. Since forming aspheric surface is easy, the design parameters for reducing the aberration is easy to be controlled, and the total optical length of the photographing optical lens assembly 10 can be shortened.

In the photographing optical lens assembly 10, a convex surface means the surface at a paraxial site is convex. A concave surface means the surface at a paraxial site is concave. Furthermore, at least one stop (such as glare stops, field stops, or other types of stops) may be disposed in the photographing optical lens assembly 10 for eliminating the stray light, improving image quality or controlling the size of the image.

As for the optical lens assembly 10, the specific schemes are further described with the following embodiments. Parameters in the embodiments are defined as follows. Fno is an f-number of the photographing optical lens assembly, and HFOV is a half of maximal field of view in the photographing optical lens assembly 10. The aspheric surface in the embodiments may satisfy, but is not limited to, the following aspheric surface equation (Condition ASP):

$$X(Y) = (Y^2/R)/(1 + sqrt(1 - (1+k)*(Y/R)^2)) + \sum_i (Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12, 14 and 16.

The First Embodiment

Embodiment 1

FIG. 1A is a schematic structural view of the first embodiment of the photographing optical lens assembly. The photographing optical lens assembly 10 comprises, from the object side to the image side along the optical axis (from left to right in FIG. 1A) in sequence, the first lens element 110, an stop, the second lens element 120, the third lens element 130, the fourth lens element 140, the fifth lens element 150, the infrared filter 160 and the image sensor 172 disposed on the image plane 170. In this embodiment, the stop can be an aperture stop 100.

In this embodiment, the reference wavelength of the light incident in the photographing optical lens assembly 10 is 587.6 nanometer (nm). However, in some embodiments, the reference wavelength of such light can be adjusted.

The first lens element 110 has positive refractive power. The second lens element 120 with negative refractive power comprises the concave object-side surface 121 and the concave image-side surface 122. The third lens element 130 with negative refractive power comprises the concave object-side surface and the convex image-side surface 132. The fourth lens element 140 with negative refractive power comprises the concave object-side surface 141 and the convex image-side surface 142.

The detailed data of the photographing optical lens assembly 10 is as shown in Table 1-1 below:

TABLE 1-1

Embodiment 1
f = 3.22 mm, Fno = 2.70, HFOV = 34.0 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.414450(ASP) | 0.432 | Plastic | 1.544 | 55.9 | 2.04 |
| 2 | | −4.653300(ASP) | −0.017 | | | | |
| 3 | Ape. Stop | Plano | 0.085 | | | | |
| 4 | Lens 2 | −8.255500(ASP) | 0.245 | Plastic | 1.633 | 23.4 | −5.28 |
| 5 | | 5.685300(ASP) | 0.399 | | | | |
| 6 | Lens 3 | −1.785440(ASP) | 0.225 | Plastic | 1.633 | 23.4 | −18.56 |
| 7 | | −2.208300(ASP) | 0.256 | | | | |
| 8 | Lens 4 | −0.937250(ASP) | 0.392 | Plastic | 1.544 | 55.9 | −9.10 |
| 9 | | −1.326430(ASP) | 0.050 | | | | |
| 10 | Lens 5 | 1.097980(ASP) | 0.744 | Plastic | 1.544 | 55.9 | 7.91 |
| 11 | | 1.121790(ASP) | 0.500 | | | | |
| 12 | IR-cut filter | Plano | 0.200 | Glass | 1.517 | 64.2 | |
| 13 | | Plano | 0.464 | | | | |
| 14 | Image | Plano | | | | | |

Note:
Reference wavelength is d-line 587.6 nm
ASP represents aspheric

In Table 1-1, the image-side surfaces of the first lens element 110, the second lens element 120, the third lens element 130, the fourth lens element 140, the fifth lens element 150 can be aspheric, and the aspheric surfaces can satisfy Condition ASP, but are not limited thereto. As for the parameters of the aspheric surfaces, reference is made to Table 1-2 below:

TABLE 1-2

Aspheric Coefficients

| Surface # | 1 | 2 | 4 | 5 | 6 |
|---|---|---|---|---|---|
| K | −2.20109E−01 | −1.19194E+00 | −1.00000E+00 | −1.39142E+01 | 4.43820E+00 |
| $A_4$ | −3.50831E−02 | −6.54002E−02 | 2.47996E−02 | −3.07437E−02 | −2.37490E−01 |
| $A_6$ | −1.65382E−01 | −1.48691E−02 | 2.66687E−01 | 3.98020E−02 | −2.54444E−01 |
| $A_8$ | 7.12907E−02 | −2.93240E−01 | −4.99135E−01 | 2.13379E−02 | 9.49234E−01 |
| $A_{10}$ | −4.93093E−01 | 4.47584E−02 | 7.07399E−01 | −7.43040E−01 | −1.17545E+00 |
| $A_{12}$ | −1.58503E−01 | 4.56503E−02 | −1.89334E−02 | 5.17121E−01 | 1.56180E+00 |

| Surface # | 7 | 8 | 9 | 10 | 11 |
|---|---|---|---|---|---|
| K | −2.33610E+01 | −1.18116E+01 | −1.70417E+00 | −8.75883E+00 | −5.44621E+00 |
| $A_4$ | −2.20145E−01 | 1.97501E−02 | −6.38566E−02 | −2.58551E−01 | −1.40314E−01 |
| $A_6$ | −7.47989E−02 | −1.54201E−01 | −2.69190E−03 | 1.32994E−01 | 6.32863E−02 |
| $A_8$ | 1.61514E−01 | −4.69285E−03 | 9.27023E−02 | −2.26425E−02 | −2.32857E−02 |
| $A_{10}$ | 2.41616E−01 | 9.71618E−02 | −4.17216E−02 | 1.72591E−04 | 4.00653E−03 |
| $A_{12}$ | 4.21366E−02 | −2.87509E−02 | 1.24185E−02 | −2.10626E−03 | 1.28167E−04 |
| $A_{14}$ | — | −4.24109E−03 | −5.58480E−03 | 8.39326E−04 | −1.66521E−04 |
| $A_{16}$ | — | — | — | −5.15434E−05 | 1.62867E−05 |

In Table 1-1, the curvature radius, the thickness and the focal length are shown in millimeters (mm). Surface numbers 0-14 represent the surfaces sequentially arranged from the object-side to the image-side along the optical axis. "f" stands for the focal length, "Fno" is the f-number, and "HFOV" is the half field of view of this embodiment. In Table 1-2, K represents the conic coefficient of the equation of the aspheric surface profiles. A1-A16 represent the aspheric coefficients ranging from the 1st order to the 16th. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

Embodiment 1

| f (mm) | 3.22 | $(R_7 + R_8)/(R_7 − R_8)$ | −5.82 |
|---|---|---|---|
| Ape. Stop | 2.70 | $f/f_1$ | 1.57 |
| HFOV(deg.) | 34.0 | $f/f_2$ | −0.61 |
| $V_1 − V_2$ | 32.5 | $f/f_4$ | −0.35 |
| $T_{12}/T_{23}$ | 0.17 | $f/f_3 + f/f_4 + f/f_5$ | −0.12 |
| $(R_3 + R_4)/(R_3 − R_4)$ | 0.18 | TTL/ImgH | 1.78 |

It can be observed from Table 1-3 that f/f₁ equals −6.1 which satisfies Condition 1; f/f₄ equals −035 which satisfies Condition 2; (R₃+R₄)/(R₃−R₄) equals 0.18 which satisfies Condition 3; (R₇+R₈)/(R₇−R₈) equals −5.82 which satisfies Condition 3 satisfies Condition 4.

$T_{12}/T_{23}$ equals 0.17 which satisfies Condition 5; $V_1-V_2$ equal 32.5 which satisfies Condition 6; f/f₁ equals 1.57 which satisfies Condition 7; f/f₃+f/f₄+f/f₅ equals −0.12 which satisfies Condition 8; TTL/ImgH equals 1.78 which satisfies Condition 9.

Figures 1B, 1C, 1D:
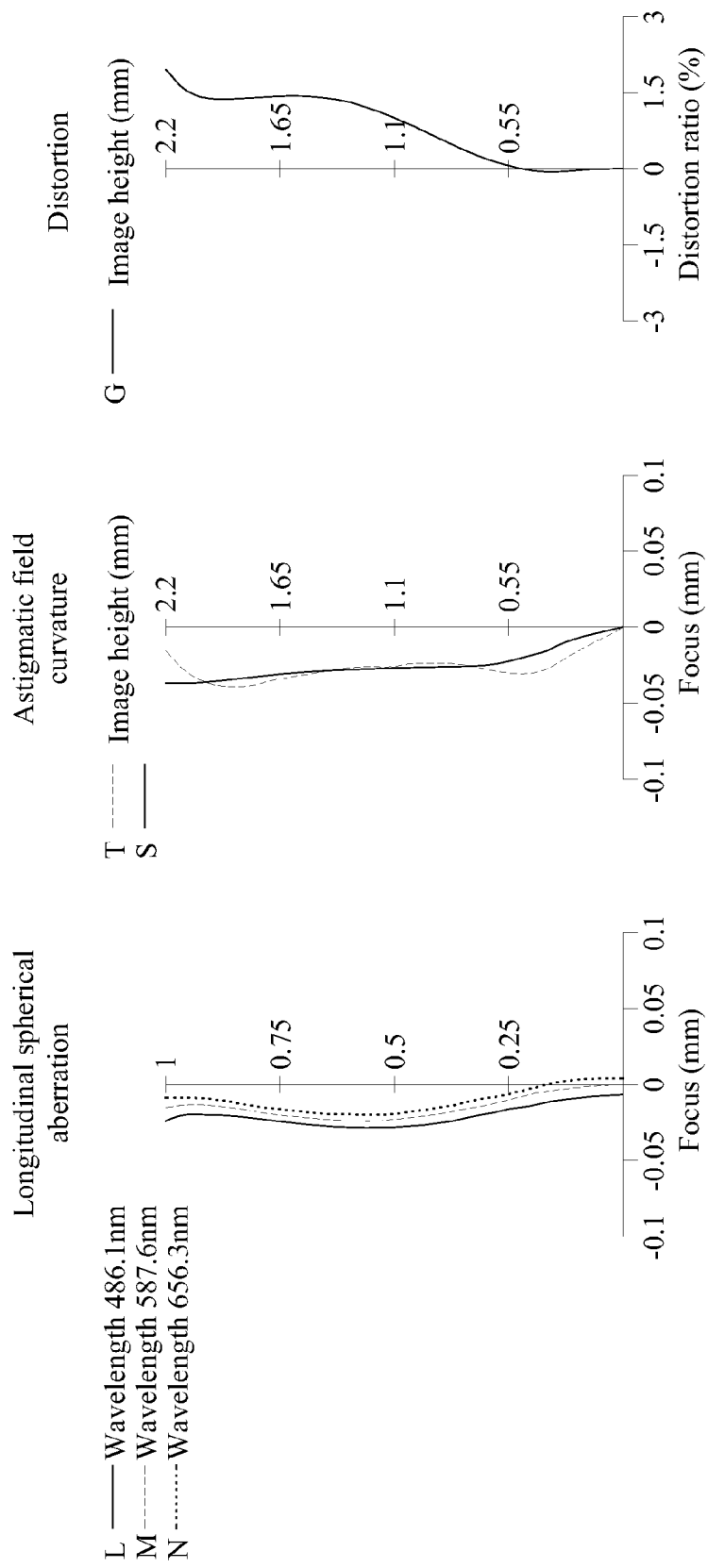
FIG. 1B is a graph of longitudinal spherical aberration curves when the lights having wavelengths of 486.1 nm, 587.6 nm, and 656.3 nm are respectively projected in the photographing optical lens assembly in FIG. 1A.
FIG. 1C is a graph of astigmatic field curves when the light having the wavelength of 587.6 nm is projected in the photographing optical lens assembly in FIG. 1A.
FIG. 1D is a graph of a distortion curve when the light having the wavelength of 587.6 nm is projected in the photographing optical lens assembly in FIG. 1A.

FIG. 1B is a graph of longitudinal spherical aberration curves when the lights having wavelengths of 486.1 nm, 587.6 nm, and 656.3 nm are respectively projected in the photographing optical lens assembly 10 in FIG. 1A. The longitudinal spherical aberration curve of the light having the wavelength of 486.1 nm in the photographing optical lens assembly 10 is indicated by a solid line L in FIG. 1B. The longitudinal spherical aberration curve of the light having the wavelength of 587.6 nm in the photographing optical lens assembly 10 is indicated by a dashed line M in FIG. 1B. The longitudinal spherical aberration curve of the light having the wavelength of 656.3 nm in the photographing optical lens assembly 10 is indicated by a dotted line N in FIG. 1B. Horizontal axis is the focus position (millimeter, mm), and vertical axis is the normalized entrance pupil or aperture value. In other words, the differences of the focus positions of the paraxial light (the longitudinal coordinate is close to 0) and the fringe light (the longitudinal coordinate is close to 1) on the image plane 180 can be seen in the longitudinal spherical aberration curves. The paraxial light and the fringe light are both parallel to the light axis. It can be observed from FIG. 1B that the longitudinal spherical aberrations generated by the photographing optical lens assembly 10 are within a range of −0.05 mm to 0.01 mm regardless of the wavelengths of the lights.

In the second embodiment to the sixth embodiment and the graphs of the longitudinal spherical aberration curves in FIGS. 2B, 3B, 4B, 5B, and 6B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a graph of astigmatic field curves when the light having the wavelength of 587.6 nm is projected in the photographing optical lens assembly 10 in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and vertical axis is the image height (mm). Focus positions corresponding to different curvatures can be seen in the tangential plane and the sagittal plane. It can be observed from FIG. 1C that the astigmatic field curvature of the tangential plane is within a range of −0.05 mm to 0 mm, and the astigmatic field curvature of the sagittal plane is within a range of −0.05 mm to 0 mm.

In the second embodiment to the sixth embodiment and the graphs of the astigmatic field curves in FIGS. 2C, 3C, 4C, 5C, and 6C, the solid line S indicates the astigmatic field curve of the sagittal plane, and the dashed line T indicates the astigmatic field curve of the tangential plane, which will not be repeated herein for conciseness.

FIG. 1D is a graph of a distortion curve when the light having the wavelength of 587.6 nm is projected in the photographing optical lens assembly 10 in FIG. 1A. The horizontal axis is the distortion ratio (%), and the vertical axis is the image height (mm). Distortion ratios caused by the different Image heights can be observed in the distortion curve G. It can be observed from FIG. 1D that the distortion ratio is within a range of −0.5% to 3%. As shown in FIGS. 1B to 1D, the photographing optical lens assembly 10, designed according to the first embodiment, is capable of effectively correcting various aberrations.

In the second embodiment to the sixth embodiment and the graphs of the distortion curves in FIGS. 2D, 3D, 4D, 5D, and 6D, the solid line G indicates the distortion curve of the light having the wavelength of 587.6 nm, which will not be repeated herein for conciseness.

It should be noted that the distortion curves and the astigmatic field curves of the wavelength of 486.1 nm and 656.3 nm are highly similar to the distortion curve and the astigmatic field curves of the wavelength of 587.6 nm. In order to prevent the confusion of reading the curves in FIGS. 1C and 1D, the distortion curve and the astigmatic field curves of wavelengths of 486.1 nm and 656.3 nm are not shown in FIGS. 1C and 1D, and the same applies throughout the rest of the embodiments of this present disclosure.

The Second Embodiment

Embodiment 2

Figure 2A:
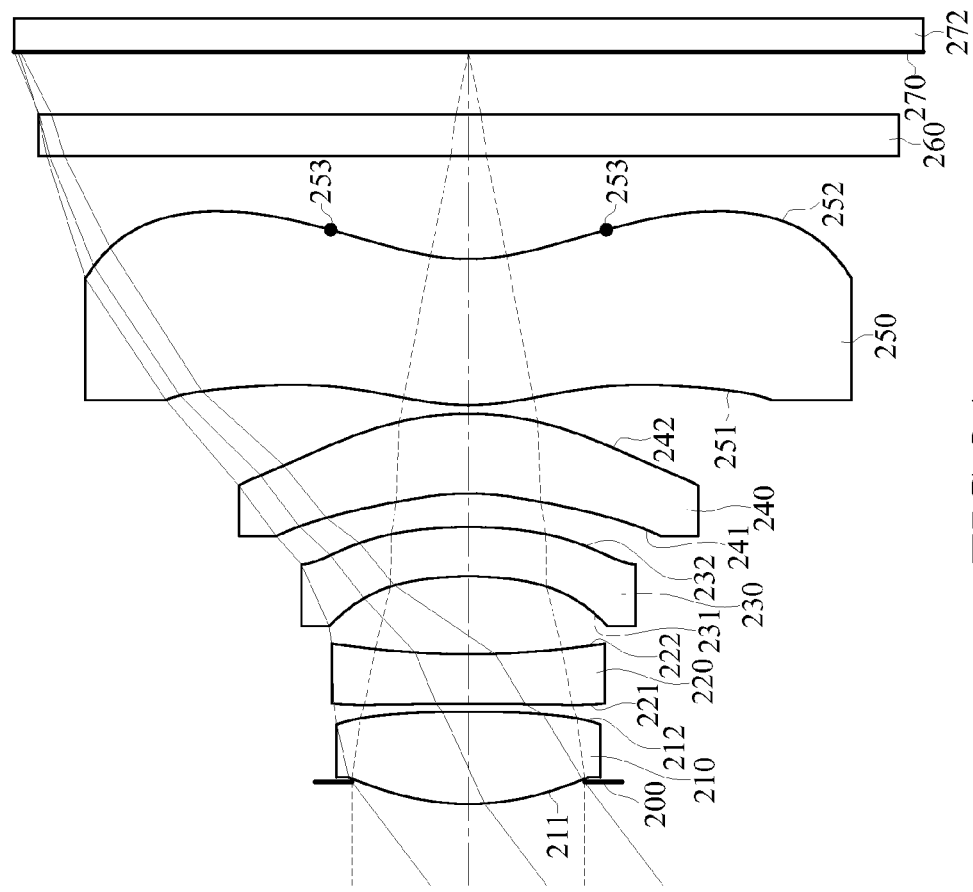
FIG. 2A is a schematic structural view of a second embodiment of a photographing optical lens assembly.

FIG. 2A is a schematic structural view of the second embodiment of the photographing optical lens assembly 20. The specific implementation and elements of the second embodiment are substantially the same as those in the first embodiment. The element symbols in the second embodiment all begin with "2" which correspond to those in the first embodiment with the same function or structure. For conciseness, only the differences are illustrated below, and the similarities will not be repeated herein.

In this embodiment, the reference wavelength of the light received by the photographing optical lens assembly 20 is 587.6 nm, and such reference wavelength is taken as an example. In some embodiments the reference wavelength of the light received by the photographing optical lens assembly 20 can be adjusted according to actual requirements, and is not limited to the wavelength value mentioned above.

In this embodiment, a first lens element 210 has positive refractive power. A second lens element 220 has negative refractive power and comprises a concave object-side surface 221 and a concave image-side surface 222. A third lens element 230 has negative refractive power and comprises a concave object-side surface 231 and a convex image-side surface 232. A fourth lens element 240 has negative refractive power and comprises a concave object-side surface 241 and a convex image-side surface 242.

The detailed data of the photographing optical lens assembly 20 is as shown in Table 2-1 below:

TABLE 2-1

| Embodiment 2 f = 2.93, Fno = 2.60, HFOV = 37.1 deg. | | | | | | |
|---|---|---|---|---|---|---|
| Surface # | | Curvature radius (mm) | Thickness (mm) | Material | Index | Abbe # | Focal length |
| 0 | Object | Plano | Infinity | | | | |
| 1 | Ape. Plano Stop | −0.105 | | | | | |

TABLE 2-1-continued

Embodiment 2
f = 2.93, Fno = 2.60, HFOV = 37.1 deg.

| Surface # | | Curvature radius (mm) | Thickness (mm) | Material | Index | Abbe # | Focal length |
|---|---|---|---|---|---|---|---|
| 2 | Lens 1 | 1.273400 (ASP) | 0.447 | Plastic | 1.544 | 55.9 | 1.97 |
| 3 | | −5.985400 (ASP) | 0.037 | | | | |
| 4 | Lens 2 | −24.708100 (ASP) | 0.241 | Plastic | 1.650 | 21.4 | −5.02 |
| 5 | | 3.775000 (ASP) | 0.377 | | | | |
| 6 | Lens 3 | −1.859270 (ASP) | 0.240 | Plastic | 1.633 | 23.4 | −39.9 |
| 7 | | −2.107200 (ASP) | 0.163 | | | | |
| 8 | Lens 4 | −1.044670 (ASP) | 0.386 | Plastic | 1.544 | 55.9 | −12.7 |
| 9 | | −1.390510 (ASP) | 0.041 | | | | |
| 10 | Lens 5 | 1.110860 (ASP) | 0.708 | Plastic | 1.544 | 55.9 | 13.44 |
| 11 | | 1.105630 (ASP) | 0.500 | | | | |
| 13 | IR-cut filter | Plano | 0.200 | Glass | 1.517 | 64.2 | — |
| 14 | | Plano | 0.305 | | | | |
| 15 | Image | Plano | — | | | | |

Note:
Reference wavelength is d-line 587.6 nm, ASP represents aspheric.

In Table 2-1, from the first lens element 210 to the sixth lens element 260, all lens elements can be aspheric, and the aspheric surfaces can satisfy Condition ASP, but are not limited thereto. As for the parameters of the aspheric surfaces, reference is made to Table 2-2 below.

TABLE 2-2

Aspheric Coefficients

| Surface # | 2 | 3 | 4 | 5 | 6 |
|---|---|---|---|---|---|
| K | −1.03652E−01 | −9.82757E+00 | −1.00000E+00 | −1.28594E+01 | 3.50113E+00 |
| $A_4$ | −2.97729E−02 | −5.83862E−02 | −7.37721E−02 | −3.29093E−02 | −3.89861E−01 |
| $A_6$ | −1.08545E−01 | −2.28105E−01 | 4.55989E−01 | 7.74905E−02 | −4.68814E−01 |
| $A_8$ | 5.01559E−02 | −1.12771E−01 | −7.62743E−01 | 5.91384E−02 | 9.29214E−01 |
| $A_{10}$ | −6.02697E−01 | 1.99540E−01 | 4.71264E−01 | −4.55954E−01 | −1.09638E+00 |
| $A_{12}$ | −1.02032E+00 | −7.06147E−01 | 1.28373E+00 | 4.76624E−01 | 1.53938E+00 |

| Surface # | 7 | 8 | 9 | 10 | 11 |
|---|---|---|---|---|---|
| K | −2.67558E+01 | −2.00000E+01 | −2.07575E+00 | −1.02340E+01 | −5.50074E+00 |
| $A_4$ | −3.64239E−01 | 3.97300E−02 | −2.14761E−02 | −2.54691E−01 | −1.16956E−01 |
| $A_6$ | −6.40878E−02 | −1.77669E−01 | 7.69442E−03 | 1.45093E−01 | 5.11371E−02 |
| $A_8$ | 1.85102E−01 | 1.08597E−02 | 8.30920E−02 | −2.45786E−02 | −1.98548E−02 |
| $A_{10}$ | 2.73202E−01 | 1.13804E−01 | −4.65302E−02 | −9.23494E−04 | 4.04408E−03 |
| $A_{12}$ | 2.97622E−01 | 5.67119E−02 | 9.44901E−03 | −2.04822E−03 | 2.02368E−08 |
| $A_{14}$ | — | −1.16125E−01 | −8.46725E−03 | 8.92756E−04 | −1.86819E−04 |
| $A_{16}$ | — | — | — | −7.90351E−05 | 2.17554E−05 |

The content of Table 2-3 may be deduced from Table 2-1.

TABLE 2-3

Embodiment 2

| f (mm) | 2.93 | $(R_7 + R_8)/(R_7 − R_8)$ | −7.04 |
|---|---|---|---|
| Ape. Stop | 2.60 | $f/f_1$ | 1.48 |
| HFOV(deg.) | 37.1 | $f/f_2$ | −0.58 |
| $V_1 − V_2$ | 34.5 | $f/f_4$ | −0.23 |
| $T_{12}/T_{23}$ | 0.10 | $f/f_3 + f/f_4 + f/f_5$ | −0.10 |
| $(R_3 + R_4)/(R_3 − R_4)$ | 0.73 | TTL/ImgH | 1.63 |

FIG. 2B is a graph of longitudinal spherical aberration curves when the lights having wavelengths of 486.1 nm, 587.6 nm, and 656.3 nm are respectively projected in the photographing optical lens assembly 20 in FIG. 2A. It can be observed from FIG. 2B that the longitudinal spherical aberrations generated by the photographing optical lens assembly 20 are within a range of −0.07 mm to 0.01 mm regardless of the wavelengths of the lights.

FIG. 2C is a graph of astigmatic field curves when the light having the wavelength of 587.6 nm is projected in the photographing optical lens assembly 20 in FIG. 2A. It can be observed from FIG. 2C that the astigmatic field curvature of the tangential plane is within a range of −0.12 mm to 0 mm, and the astigmatic field curvature of the sagittal plane is within a range of −0.075 mm to 0 mm.

FIG. 2D is a graph of a distortion curve when the light having the wavelength of 587.6 nm is projected in the photographing optical lens assembly 20 in FIG. 2A. It can be observed from FIG. 2D that the distortion ratio is within a range of −1.5% to 1%. As shown in FIGS. 2B to 2D, the photographing optical lens assembly 20, designed according to the second embodiment, is capable of effectively correcting various aberrations.

The Third Embodiment

Embodiment 3

Figure 3A:
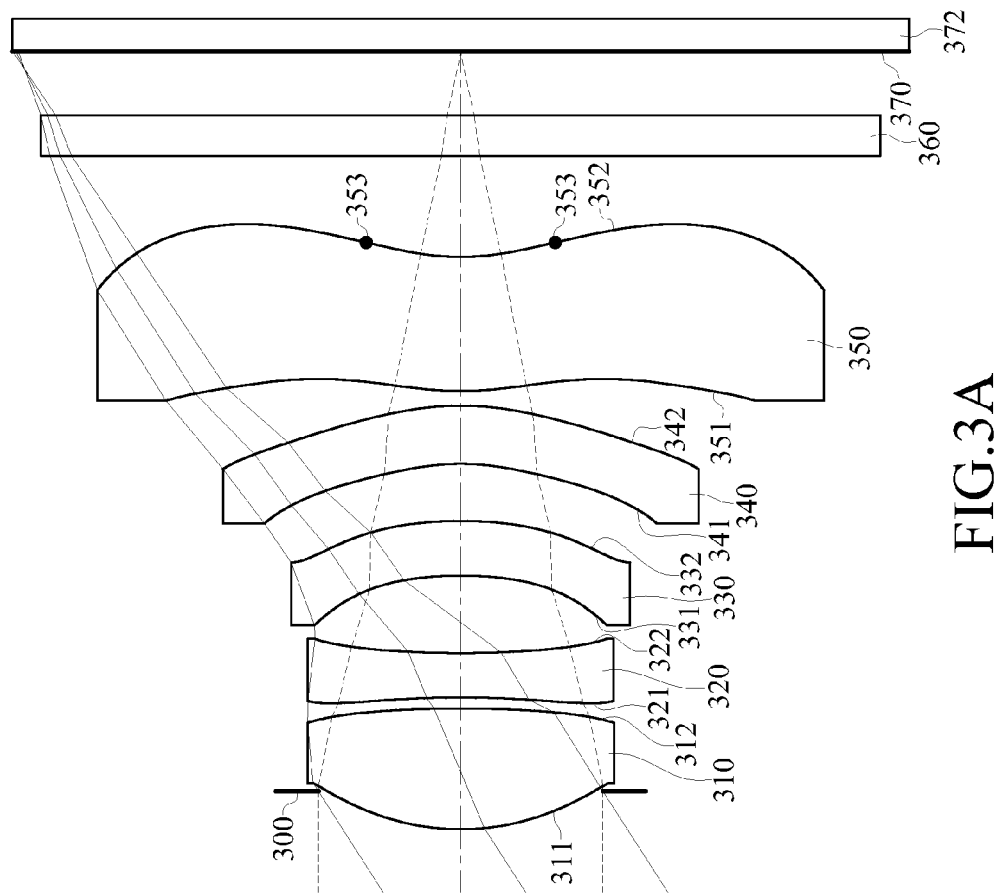
FIG. 3A is a schematic structural view of a third embodiment of an photographing optical lens assembly.

FIG. 3A is a schematic structural view of the third embodiment of the photographing optical lens assembly 30. The specific implementation and elements of the third embodiment are substantially the same as those in the first embodiment. The element symbols in the third embodiment all begin with "3" which correspond to those in the first embodiment with the same function or structure. For conciseness, only the differences are illustrated below, and the similarities will not be repeated herein.

In this embodiment, the reference wavelength of the light received by the photographing optical lens assembly 30 is 587.6 nm, and such reference wavelength is taken as an example. In some embodiments the reference wavelength of the light received by the photographing optical lens assembly 20 can be adjusted according to actual requirements, and is not limited to the wavelength value mentioned above.

In this embodiment, a first lens element 310 has positive refractive power. A second lens element 320 has negative refractive power and comprises a concave object-side surface 321 and a concave image-side surface 322. A third lens element 330 has positive refractive power and comprises a concave object-side surface 331 and a convex image-side surface 332. A fourth lens element 340 has negative refractive power and comprises a concave object-side surface 341 and a convex image-side surface 342.

The detailed data of the photographing optical lens assembly 30 is as shown in Table 3-1 below.

TABLE 3-1

Embodiment 3
f = 4.46 mm, Fno = 2.60, HFOV = 32.5 deg.

| Surface # | | Curvature radius (mm) | Thickness (mm) | Material | Index | Abbe # | Focal length |
|---|---|---|---|---|---|---|---|
| 0 | Object | Plano | Infinity | | | | |
| 1 | Ape. Stop | Plano | −0.18 | | | | |
| 2 | Lens 1 | 1.210500 (ASP) | 0.598 | Plastic | 1.544 | 55.9 | 1.91 |
| 3 | | 6.154100 (ASP) | 0.054 | | | | |
| 4 | Lens 2 | −4.954900 (ASP) | 0.220 | Plastic | 1.640 | 23.3 | −3.95 |
| 5 | | 5.257200 (ASP) | 0.383 | | | | |
| 6 | Lens 3 | −1.952150 (ASP) | 0.271 | Plastic | 1.640 | 23.3 | 64.21 |
| 7 | | −1.964530 (ASP) | 0.283 | | | | |
| 8 | Lens 4 | −1.062210 (ASP) | 0.288 | Plastic | 1.535 | 56.3 | −16.31 |
| 9 | | −1.323820 (ASP) | 0.072 | | | | |
| 10 | Lens 5 | 1.538430 (ASP) | 0.663 | Plastic | 1.535 | 56.3 | −20.00 |
| 11 | | 1.143010 (ASP) | 0.500 | | | | |
| 14 | IR-cut filter | Plano | 0.200 | Glass | 1.517 | 64.2 | — |
| 15 | | Plano | 0.319 | | | | |
| 16 | Image | Plano | | | | | |

Note:
Reference wavelength is d-line 587.6 nm, ASP represents aspheric

In Table 3-1, from the first lens element 310 to the sixth lens element 360, all lens elements can be aspheric, and the aspheric surfaces can satisfy Condition ASP, but are not limited thereto. As for the parameters of the aspheric surfaces, reference is made to Table 3-2 below.

TABLE 3-2

Aspheric Coefficients

| Surface # | 2 | 3 | 4 | 5 | 6 |
|---|---|---|---|---|---|
| K | 1.33525E−01 | −1.37502E+01 | −100000E+00 | 9.99209E+00 | 5.20449E+00 |
| $A_4$ | −1.59342E−02 | −3.74775E−02 | 9.33243E−03 | 8.72439E−03 | −2.64745E−01 |
| $A_6$ | −6.73921E−02 | −1.76984E−02 | 2.45865E−01 | 1.28624E−01 | −2.18652E−01 |
| $A_8$ | 9.55607E−02 | −1.43610E−01 | −5.49231E−01 | −1.89714E−01 | 8.29073E−01 |
| $A_{10}$ | −2.25181E−01 | 5.48209E−02 | 8.35655E−01 | 2.96735E−02 | −1.11062E+00 |
| $A_{12}$ | −1.58267E−01 | 4.56264E−02 | −1.87297E−02 | 5.17360E−01 | 1.56248E+00 |

| Surface # | 7 | 8 | 9 | 10 | 11 |
|---|---|---|---|---|---|
| K | −7.24887E+00 | −1.31301E+01 | −9.55485E+00 | −1.60390E+01 | −7.94990E+00 |
| $A_4$ | −2.71675E−01 | 1.25129E−02 | −1.73676E−02 | −2.54374E−01 | −1.23660E−01 |
| $A_6$ | −7.20720E−02 | −1.65756E−01 | −2.85514E−02 | 1.44104E−01 | 5.21484E−02 |
| $A_8$ | 1.78568E−01 | 1.33184E−02 | 6.94073E−02 | −2.54071E−02 | −2.03002E−02 |
| $A_{10}$ | 2.33860E−01 | 1.10175E−01 | −4.62454E−02 | −5.85290E−04 | 4.08138E−03 |
| $A_{12}$ | 1.22383E−01 | −4.22737E−02 | 1.32954E−02 | −1.84243E−03 | 3.45964E−05 |
| $A_{14}$ | — | −4.25091E−02 | −4.38304E−03 | 9.35461E−04 | −1.86763E−04 |
| $A_{16}$ | — | — | — | −9.70271E−05 | 2.12656E−05 |

The content of Table 3-3 may be deduced from Table 3-1.

TABLE 3-3

| Embodiment 3 | | | |
|---|---|---|---|
| f (mm) | 3.38 | $(R_7 + R_8)/(R_7 - R_8)$ | −9.12 |
| Ape. Stop | 2.40 | $f/f_1$ | 1.76 |
| HFOV(deg.) | 32.7 | $f/f_2$ | −0.86 |
| V1−V2 | 32.6 | $f/f_4$ | −0.21 |
| $T_{12}/T_{23}$ | 0.14 | $f/f_3 + f/f_4 + f/f_5$ | −0.32 |
| $(R_3 + R_4)/(R_3 - R_4)$ | −0.03 | TTL/ImgH | 1.72 |

FIG. 3B is a graph of longitudinal spherical aberration curves when the lights having wavelengths of 486.1 nm, 587.6 nm, and 656.3 nm are respectively projected in the photographing optical lens assembly 30 in FIG. 3A. It can be observed from FIG. 3B that the longitudinal spherical aberrations generated by the photographing optical lens assembly 30 are within a range of −0.05 mm to 0.01 mm regardless of the wavelengths of the lights.

FIG. 3C is a graph of astigmatic field curves when the lights having wavelengths of 486.1 nm, 587.6 nm, and 656.3 nm are respectively projected in the photographing optical lens assembly 30 in FIG. 3A. It can be observed from FIG. 3C that the astigmatic field curvature of the tangential plane is within a range of −0.05 mm to 0 mm, and the astigmatic field curvature of the sagittal plane is within a range of −0.05 mm to 0 mm.

FIG. 3D is a graph of a distortion curve when the light having the wavelength of 587.6 nm is projected in the photographing optical lens assembly 30 in FIG. 3A. It can be observed from FIG. 3D that the distortion ratio is within a range of −0.5% to 2.5%. As shown in FIGS. 3B to 3D, the photographing optical lens assembly 30, designed according to the third embodiment, is capable of effectively correcting various aberrations.

The Fourth Embodiment

Embodiment 4

Figure 4A:
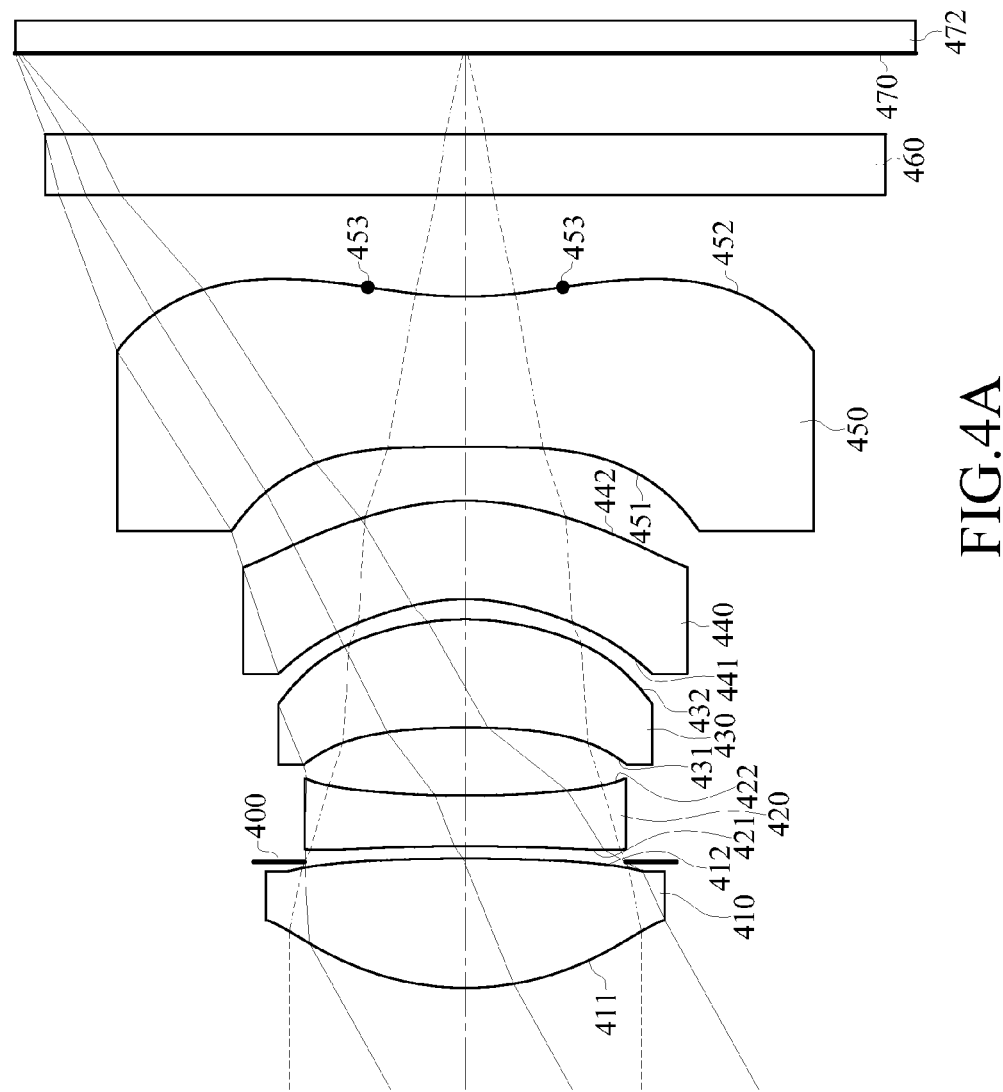
FIG. 4A is a schematic structural view of a fourth embodiment of a photographing optical lens assembly.

FIG. 4A is a schematic structural view of the fourth embodiment of the photographing optical lens assembly 40. The specific implementation and elements of the fourth embodiment are substantially the same as those in the first embodiment. The element symbols in the fourth embodiment all begin with "4" which correspond to those in the first embodiment with the same function or structure. For conciseness, only the differences are illustrated below, and the similarities will not be repeated herein.

In this embodiment, the reference wavelength of the light received by the photographing optical lens assembly 40 is 587.6 nm and such reference wavelength is taken as an example. In some embodiments the reference wavelength of the light received by the photographing optical lens assembly 20 can be adjusted according to actual requirements, and is not limited to the wavelength value mentioned above.

In this embodiment, a first lens element 410 has positive refractive power. A second lens element 420 has negative refractive power and comprises a concave object-side surface 421 and a concave image-side surface 422. A third lens element 430 has positive refractive power and comprises a concave object-side surface 431 and a convex image-side surface 432. A fourth lens element 440 has negative refractive power and comprises a concave object-side surface 441 and a convex image-side surface 442.

The detailed data of the photographing optical lens assembly 40 is as shown in Table 4-1 below.

TABLE 4-1

Embodiment 4
f = 3.98 mm, Fno = 2.30, HFOV = 29.0 deg.

| Surface # | | Curvature radius (mm) | Thickness (mm) | Material | Index | Abbe # | Focal length |
|---|---|---|---|---|---|---|---|
| 0 | Object | Plano | Infinity | | | | |
| 1 | Lens 1 | 1.419580 (ASP) | 0.636 | Plastic | 1.544 | 55.9 | 2.37 |
| 2 | | −11.817900 (ASP) | −0.016 | | | | |
| 3 | Ape. Stop | Plano | 0.076 | | | | |
| 4 | Lens 2 | −15.432100 (ASP) | 0.250 | Plastic | 1.634 | 23.8 | −5.83 |
| 5 | | 4.885400 (ASP) | 0.335 | | | | |
| 6 | Lens 3 | −3.797400 (ASP) | 0.532 | Plastic | 1.544 | 55.9 | 3.33 |
| 7 | | −1.287590 (ASP) | 0.100 | | | | |
| 8 | Lens 4 | −0.980060 (ASP) | 0.484 | Plastic | 1.634 | 23.8 | −10.9 |
| 9 | | −1.360590 (ASP) | 0.265 | | | | |
| 10 | Lens 5 | −41.152300 (ASP) | 0.739 | Plastic | 1.535 | 56.3 | −3.36 |
| 11 | | 1.892410 (ASP) | 0.500 | | | | |
| 12 | IR-cut filter | Plano | 0.300 | Glass | 1.517 | 64.2 | — |
| 13 | | Plano | 0.397 | | | | |
| 14 | Image | Plano | — | | | | |

Note:
Reference wavelength is d-line 587.6 nm

In Table 4-1, from the first lens element 410 to the sixth lens element 460, all lenses can be aspheric, and the aspheric surfaces can satisfy Condition ASP, but are not limited thereto. As for the parameters of the aspheric surfaces, reference is made to Table 4-2 below.

TABLE 4-2

| | Aspheric Coefficients | | | | |
|---|---|---|---|---|---|
| Surface # | 1 | 2 | 4 | 5 | 6 |
| K | 4.43947E−01 | −1.90148E+01 | −100000E+00 | 2.75266E+01 | 9.99600E+00 |
| $A_4$ | −1.97983E−02 | −5.49583E−02 | −8.32917E−02 | −7.01680E−02 | −1.28250E−01 |
| $A_6$ | −1.96871E−02 | 1.76188E−02 | 2.10827E−01 | 8.59232E−02 | −2.82395E−01 |
| $A_8$ | −5.24970E−02 | 8.50653E−02 | −1.70820E−01 | 8.78026E−02 | 9.24850E−01 |
| $A_{10}$ | 9.83608E−02 | −2.13104E−01 | 1.52499E−01 | −3.74269E−01 | −2.08882E+00 |
| $A_{12}$ | −1.27646E−01 | 9.92486E−02 | −1.89213E−02 | 5.17132E−01 | 1.56181E+00 |

TABLE 4-2-continued

Aspheric Coefficients

| Surface # | 7 | 8 | 9 | 10 | 11 |
|---|---|---|---|---|---|
| K | −8.77064E+00 | −6.14633E+00 | −6.03179E+00 | −2.00000E+01 | −1.21362E+01 |
| $A_4$ | −1.64078E−01 | −3.69395E−02 | −5.39729E−02 | −2.92431E−01 | −1.25247E−01 |
| $A_6$ | −1.82385E−01 | −1.80306E−01 | −2.32339E−02 | 9.54797E−02 | 5.24773E−02 |
| $A_8$ | −3.29103E−02 | −3.62530E−02 | 7.51986E−02 | −2.40179E−02 | −1.96474E−02 |
| $A_{10}$ | 8.47587E−02 | 1.16636E−01 | −5.40203E−02 | −4.42871E−03 | 2.92970E−03 |
| $A_{12}$ | −2.06208E−02 | −2.03486E−02 | 1.07224E−02 | −3.57966E−03 | 1.51791E−04 |
| $A_{14}$ | — | −1.86384E−03 | 6.35436E−03 | 7.25426E−04 | −9.26447E−05 |
| $A_{16}$ | — | — | — | −2.95592E−04 | 1.55612E−06 |

The content of Table 4-3 may be deduced from Table 4-1.

TABLE 4-3

Embodiment 4

| f (mm) | 3.98 | $(R_7 + R_8)/(R_7 − R_8)$ | −6.15 |
|---|---|---|---|
| Ape. Stop | 2.30 | $f/f_1$ | 1.68 |
| HFOV(deg.) | 29.0 | $f/f_2$ | −0.68 |
| $V_1 − V_2$ | 32.1 | $f/f_4$ | −0.37 |
| $T_{12}/T_{23}$ | 0.18 | $f/f_3 + f/f_4 + f/f_5$ | −0.35 |
| $(R_3 + R_4)/(R_3 − R_4)$ | 0.52 | TTL/ImgH | 2.04 |

FIG. 4B is a graph of longitudinal spherical aberration curves when the lights having wavelengths of 486.1 nm, 587.6 nm, and 656.3 nm are respectively projected in the photographing optical lens assembly 40 in FIG. 4A. It can be observed from FIG. 4B that the longitudinal spherical aberrations generated by the photographing optical lens assembly 40 are within a range of −0.025 mm to 0.075 mm regardless of the wavelengths of the lights.

FIG. 4C is a graph of astigmatic field curves when the lights having wavelengths of 486.1 nm, 587.6 nm, and 656.3 nm are respectively projected in the photographing optical lens assembly 40 in FIG. 4A. It can be observed from FIG. 4C that the astigmatic field curvature of the tangential plane is within a range of −0.01 mm to 0.02 mm, and the astigmatic field curvature of the sagittal plane is within a range of −0.03 mm to 0 mm.

FIG. 4D is a graph of a distortion curve when the light having the wavelength of 587.6 nm is projected in the photographing optical lens assembly 40 in FIG. 4A. It can be observed from FIG. 4D that the distortion ratio is within a range of −0.5% to 1.5%. As shown in FIGS. 4B to 4D, the photographing optical lens assembly 40, designed according to the fourth embodiment, is capable of effectively correcting various aberrations.

The Fifth Embodiment

Embodiment 5

Figure 5A:
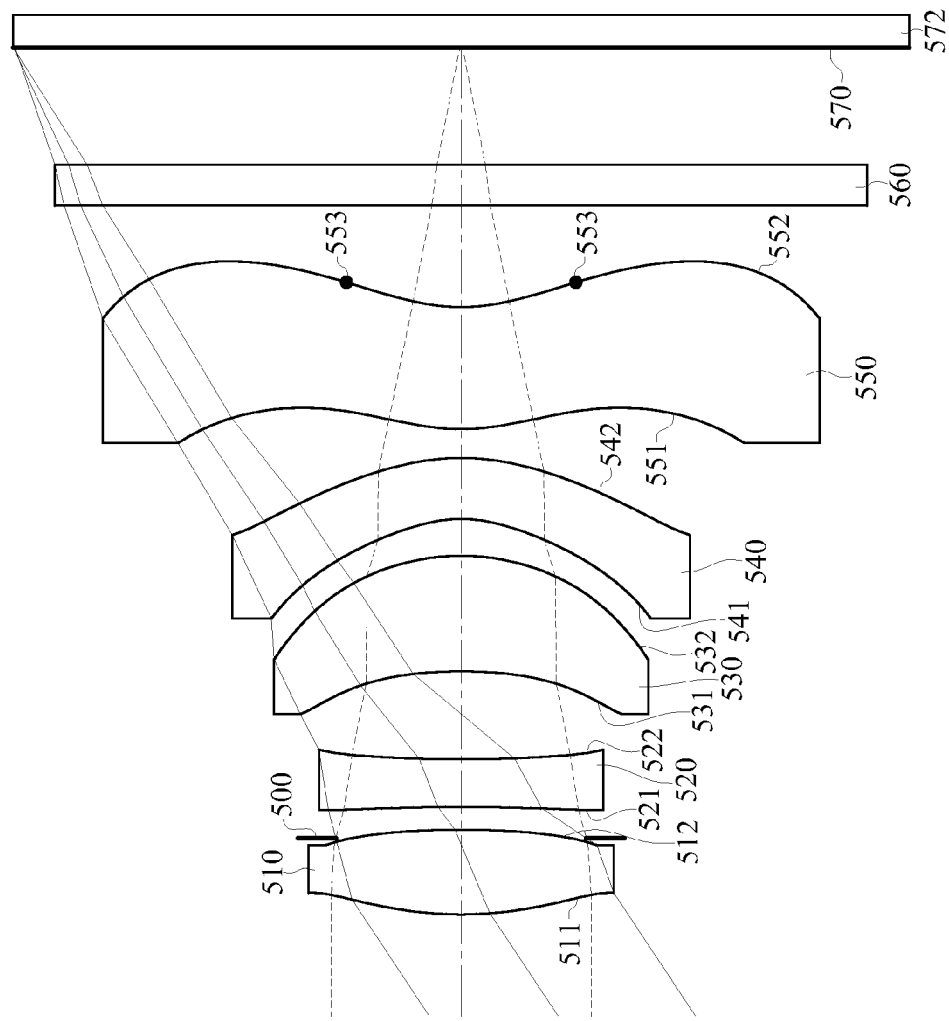
FIG. 5A is a schematic structural view of a fifth embodiment of a photographing optical lens assembly.

FIG. 5A is a schematic structural view of the fifth embodiment of the photographing optical lens assembly 50. The specific implementation and elements of the fifth embodiment are substantially the same as those in the first embodiment. The element symbols in the fifth embodiment all begin with "5" which correspond to those in the first embodiment with the same function or structure. For conciseness, only the differences are illustrated below, and the similarities will not be repeated herein.

In this embodiment, the reference wavelength of the light received by the photographing optical lens assembly 50 is 587.6 nm and such reference wavelength is taken as an example. In some embodiments the reference wavelength of the light received by the photographing optical lens assembly 20 can be adjusted according to actual requirements, and is not limited to the wavelength value mentioned above.

In this embodiment, a first lens element 510 has positive refractive power. A second lens element 520 has negative refractive power and comprises a concave object-side surface 521 and a concave image-side surface 522. A third lens element 530 has positive refractive power and comprises a concave object-side surface 531 and a convex image-side surface 532. A fourth lens element 540 has negative refractive power and comprises a concave object-side surface 541 and a convex image-side surface 542.

The detailed data of the photographing optical lens assembly 50 is as shown in Table 5-1 below.

TABLE 5-1

Embodiment 5
f = 3.33 mm, Fno = 2.60, HFOV = 33.5 deg.

| Surface # | | Curvature Radius (mm) | Thickness (mm) | Material | Index | Abbe # | Focal length |
|---|---|---|---|---|---|---|---|
| 0 | Object | Plano | Infinity | | | | |
| 1 | Lens 1 | 1.835690 (ASP) | 0.417 | Plastic | 1.544 | 55.9 | 2.40 |
| 2 | | −4.167100 (ASP) | −0.04 | | | | |
| 3 | Ape. Stop | Plano | 0.154 | | | | |
| 4 | Lens 2 | −9.775200 (ASP) | 0.234 | Plastic | 1.650 | 21.4 | −5.92 |
| 5 | | 6.407700 (ASP) | 0.433 | | | | |
| 6 | Lens 3 | −2.224690 (ASP) | 0.569 | Plastic | 1.544 | 55.9 | 3.21 |
| 7 | | −1.067400 (ASP) | 0.181 | | | | |
| 8 | Lens 4 | −0.641620 (ASP) | 0.300 | Plastic | 1.583 | 30.2 | −3.32 |
| 9 | | −1.125210 (ASP) | 0.142 | | | | |
| 10 | Lens 5 | 1.033200 (ASP) | 0.600 | Plastic | 1.544 | 55.9 | 21.86 |
| 11 | | 0.899930 (ASP) | 0.500 | | | | |
| 12 | IR-cut filter | Plano | 0.200 | Glass | 1.517 | 64.2 | — |
| 13 | | Plano | 0.577 | | | | |
| 14 | Image | Plano | — | | | | |

Note:
Reference wavelength is d-line 587.6 nm

In Table 5-1, from the first lens element 510 to the sixth lens element 560, all lenses can be aspheric, and the aspheric surfaces can satisfy Condition ASP, but are not limited thereto. As for the parameters of the aspheric surfaces, reference is made to Table 5-2 below.

TABLE 5-2

Aspheric Coefficients

| Surface # | 1 | 2 | 4 | 5 | 6 |
|---|---|---|---|---|---|
| K | −3.07196E−01 | −1.58082E+00 | −100000E+00 | −100000E+01 | 5.46719E+00 |
| $A_4$ | −3.97000E−02 | −5.91402E−02 | −1.12174E−02 | −5.06134E−02 | −1.36596E−01 |
| $A_6$ | −1.46948E−01 | −5.53764E−03 | 1.90484E−01 | 1.38700E−01 | −2.47756E−01 |
| $A_8$ | 1.54041E−01 | −3.47172E−01 | −3.67722E−01 | −4.43534E−02 | 8.99998E−01 |
| $A_{10}$ | −4.14558E−01 | 1.36935E−01 | 4.16341E−01 | −1.45751E+00 | −1.37029E+00 |
| $A_{12}$ | −1.58489E−01 | 4.56610E−02 | −1.89227E−02 | 5.17131E−01 | 1.56181E+00 |

| Surface # | 7 | 8 | 9 | 10 | 11 |
|---|---|---|---|---|---|
| K | −4.68846E+00 | −4.82334E+00 | −4.74219E+00 | −7.95057E+00 | −4.96276E+00 |
| $A_4$ | −2.82574E−01 | −8.08797E−02 | −3.68733E−02 | −2.82555E−01 | −1.58178E−01 |
| $A_6$ | −1.41553E−01 | −1.76779E−01 | −3.44750E−2 | 1.35388E−01 | 7.23991E−02 |
| $A_8$ | 6.15788E−02 | 6.35478E−03 | 7.16712E−02 | −2.36526E−02 | −2.36624E−02 |
| $A_{10}$ | 1.14320E−01 | 1.22550E−01 | −4.83034E−02 | −1.18452E−03 | 3.34573E−03 |
| $A_{12}$ | −9.57766E−02 | −2.70413E−02 | 1.48985E−02 | −2.60994E−03 | 1.03965E−04 |
| $A_{14}$ | — | −7.64650E−02 | 2.97680E−03 | 8.80642E−04 | −1.32433E−04 |
| $A_{16}$ | — | — | — | 1.04892E−04 | 1.43734E−05 |

The content of Table 5-3 may be deduced from Table 5-1.

TABLE 5-3

Embodiment 5

| f (mm) | 3.33 | $(R_7 + R_8)/(R_7 − R_8)$ | −3.65 |
|---|---|---|---|
| Ape. Stop | 2.60 | $f/f_1$ | 1.39 |
| HFOV(deg.) | 33.5 | $f/f_2$ | −0.56 |
| $V_1 − V_2$ | 34.5 | $f/f_4$ | −1.00 |
| $T_{12}/T_{23}$ | 0.26 | $f/f_3 + f/f_4 + f/f_5$ | 0.19 |
| $(R_3 + R_4)/(R_3 − R_4)$ | 0.21 | TTL/ImgH | 1.91 |

Figures 5B, 5C, 5D:
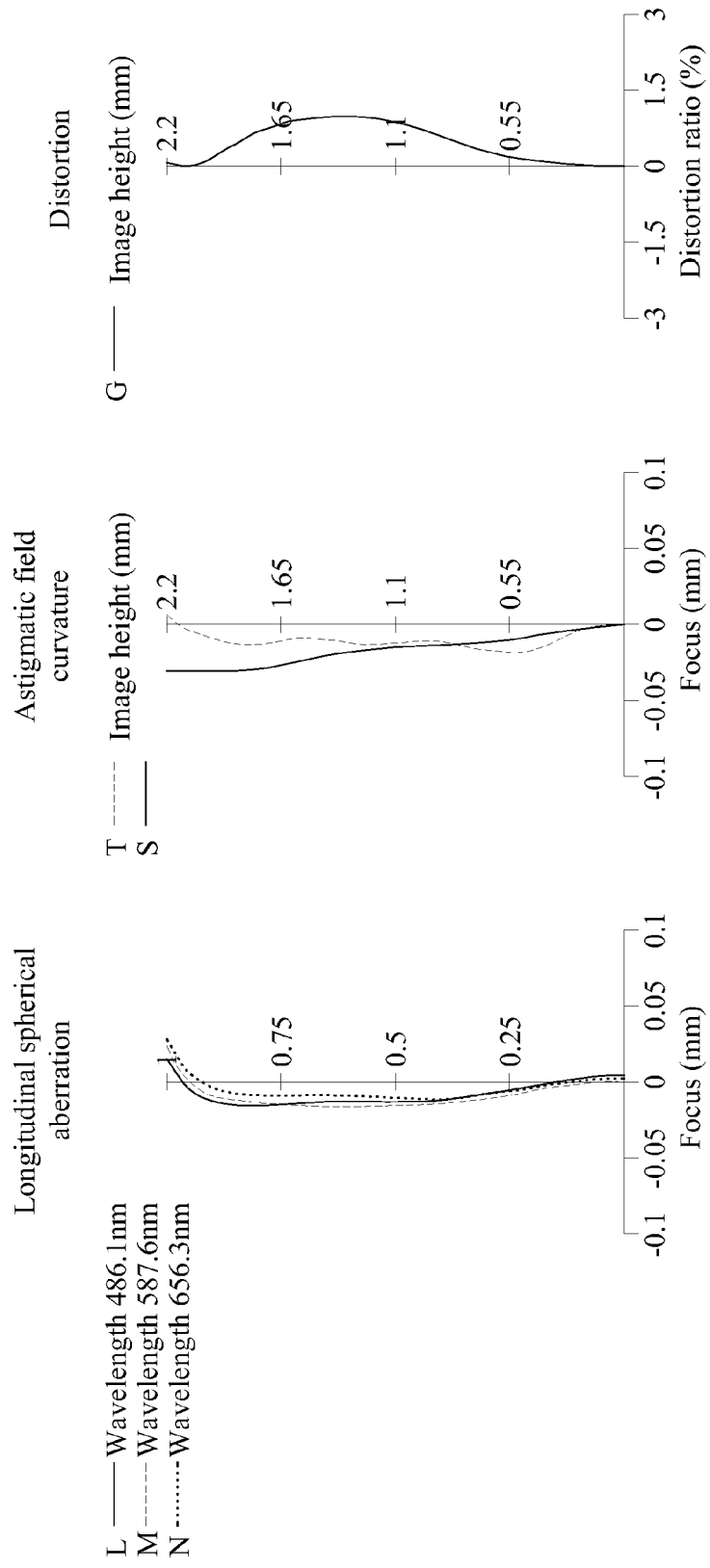
FIG. 5B is a graph of longitudinal spherical aberration curves when the lights having wavelengths of 486.1 nm, 587.6 nm, and 656.3 nm are respectively projected in the photographing optical lens assembly in FIG. 5A.
FIG. 5C is a graph of astigmatic field curves when the light having the wavelength of 587.6 nm is projected in the photographing optical lens assembly in FIG. 5A.
FIG. 5D is a graph of a distortion curve when the light having the wavelength of 587.6 nm is projected in the photographing optical lens assembly in FIG. 5A.

FIG. 5B is a graph of longitudinal spherical aberration curves when the lights having wavelengths of 486.1 nm, 587.6 nm, and 656.3 nm are respectively projected in the photographing optical lens assembly 50 in FIG. 5A. It can be observed from FIG. 5B that the longitudinal spherical aberrations generated by the photographing optical lens assembly 50 are within a range of −0.03 mm to 0.05 mm regardless of the wavelengths of the lights.

FIG. 5C is a graph of astigmatic field curves when the lights having wavelengths of 486.1 nm, 587.6 nm, and 656.3 nm are respectively projected in the photographing optical lens assembly 50 in FIG. 5A. It can be observed from FIG. 5C that the astigmatic field curvature of the tangential plane is within a range of −0.03 mm to 0.01 mm, and the astigmatic field curvature of the sagittal plane is within a range of −0.04 mm to 0 mm.

FIG. 5D is a graph of a distortion curve when the lights having wavelengths of 486.1 nm, 587.6 nm, and 656.3 nm are respectively projected in the photographing optical lens assembly 50 in FIG. 5A. It can be observed from FIG. 5D that the distortion ratio is within a range of 0% to 1.5%. As shown in FIGS. 5B to 5D, the photographing optical lens assembly 50, designed according to the fifth embodiment, is capable of effectively correcting various aberrations.

The Sixth Embodiment

Embodiment 6

Figure 6A:
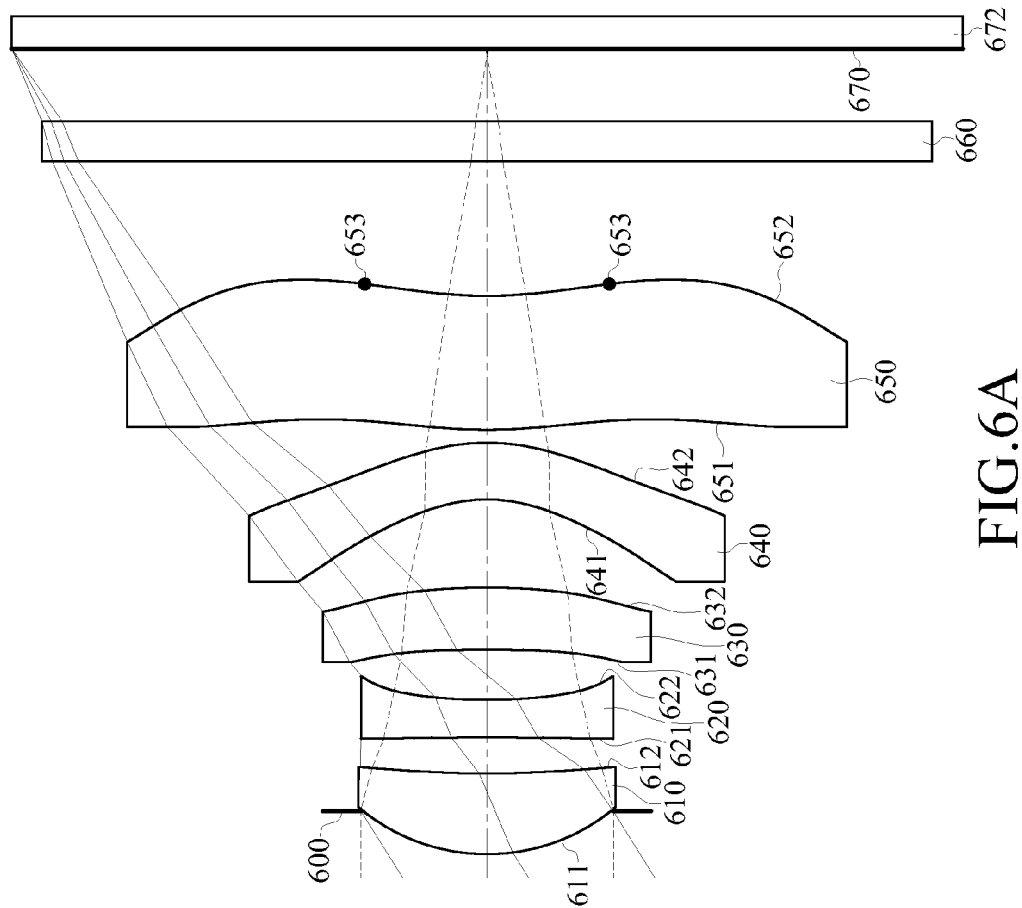
FIG. 6A is a schematic structural view of a sixth embodiment of a photographing optical lens assembly.

FIG. 6A is a schematic structural view of the sixth embodiment of the photographing optical lens assembly 60. The specific implementation and elements of the sixth embodiment are substantially the same as those in the first embodiment. The element symbols in the sixth embodiment all begin with "6" which correspond to those in the first embodiment with the same function or structure. For conciseness, only the differences are illustrated below, and the similarities will not be repeated herein.

In this embodiment, for example, the reference wavelength of the light received by the photographing optical lens assembly 60 is 587.6 nm, and such reference wavelength is taken as an example. In some embodiments the reference wavelength of the light received by the photographing optical lens assembly 20 can be adjusted according to actual requirements, and is not limited to the wavelength value mentioned above.

In this embodiment, a first lens element 610 has positive refractive power. A second lens element 620 has negative refractive power and comprises a concave object-side surface 621 and a concave image-side surface 622. A third lens element 630 has positive refractive power and comprises a concave object-side surface 631 and a convex image-side surface 632. A fourth lens element 640 has negative refractive power and comprises a concave object-side surface 641 and a convex image-side surface 642.

The detailed data of the photographing optical lens assembly 60 is as shown in Table 6-1 below.

TABLE 6-1

Embodiment 6
f = 5.54 mm, Fno = 2.95, HFOV = 32.0 deg.

| Surface # | | Curvature Radius (mm) | Thickness (mm) | Material | Index | Abbe # | Focal length |
|---|---|---|---|---|---|---|---|
| 0 | Object | Plano | Infinity | | | | |
| 1 | Ape. Stop | Plano | −0.320 | | | | |
| 2 | Lens 1 | 1.496830 (ASP) | 0.601 | Plastic | 1.544 | 55.9 | 3.32 |
| 3 | | 7.462700 (ASP) | 0.268 | | | | |
| 4 | Lens 2 | −72.415100 (ASP) | 0.280 | Plastic | 1.650 | 21.4 | −5.83 |
| 5 | | 4.002600 (ASP) | 0.373 | | | | |
| 6 | Lens 3 | −14.650100 (ASP) | 0.463 | Plastic | 1.634 | 23.8 | 12.1 |
| 7 | | −5.121600 (ASP) | 0.657 | | | | |

TABLE 6-1-continued

Embodiment 6
f = 5.54 mm, Fno = 2.95, HFOV = 32.0 deg.

| Surface # | | Curvature Radius (mm) | Thickness (mm) | Material | Index | Abbe # | Focal length |
|---|---|---|---|---|---|---|---|
| 8 | Lens 4 | −1.138390 (ASP) | 0.423 | Plastic | 1.544 | 55.9 | −13.3 |
| 9 | | −1.525780 (ASP) | 0.097 | | | | |
| 10 | Lens 5 | 3.886500 (ASP) | 0.997 | Plastic | 1.544 | 55.9 | −128 |
| 11 | | 3.348600 (ASP) | 1.000 | | | | |
| 12 | IR-cut filter | Plano | 0.300 | Glass | 1.517 | 64.2 | — |
| 13 | | Plano | 0.541 | | | | |
| 14 | Image | Plano | — | | | | |

Note:
Reference wavelength is d-line 587.6 nm

In Table 6-1, from the first lens element 610 to the sixth lens element 660, all lens elements can be aspheric, and the aspheric surfaces can satisfy Condition ASP, but are not limited thereto. As for the parameters of the aspheric surfaces, reference is made to Table 6-2 below.

TABLE 6-2

Aspheric Coefficients

| Surface # | 2 | 3 | 4 | 5 | 6 |
|---|---|---|---|---|---|
| K | 4.94146E−01 | 5.69582E+00 | 200000E+01 | −5.90659E−02 | −1.36698E+01 |
| $A_4$ | −2.06805E−02 | −2.71618E−02 | −5.38005E−02 | −1.88279E−02 | −6.79391E−02 |
| $A_6$ | 1.57038E−02 | 2.10330E−02 | 7.21385E−02 | 1.15769E−01 | −1.49916E−03 |
| $A_8$ | −4.93789E−02 | −1.18518E−02 | 1.87498E−02 | −2.98611E−02 | −1.09380E−02 |
| $A_{10}$ | 3.91964E−02 | 9.67965E−04 | −4.10286E−02 | 4.36923E−02 | 3.43097E−02 |
| $A_{12}$ | −1.86034E−02 | — | — | — | −1.53067E−02 |
| $A_{14}$ | — | — | — | — | 6.38445E−03 |
| $A_{16}$ | — | — | — | — | 4.40078E−05 |

| Surface # | 7 | 8 | 9 | 10 | 11 |
|---|---|---|---|---|---|
| K | 1.37983E+01 | −1.00000E+00 | −1.00000E+00 | −9.00365E+00 | −4.15152E+00 |
| $A_4$ | −9.11844E−03 | 1.43173E−01 | 8.87976E−02 | −5.48733E−02 | −5.05743E−02 |
| $A_6$ | −2.69900E−02 | −5.80094E−02 | −1.53468E−02 | 1.25016E−02 | 9.96424E−03 |
| $A_8$ | 2.62160E−02 | −6.47102E−04 | 2.08509E−03 | −1.22335E−03 | −1.70842E−03 |
| $A_{10}$ | 1.23829E−03 | 7.01127E−03 | −6.52288E−04 | 4.83517E−05 | 1.60989E−04 |
| $A_{12}$ | — | −9.29348E−04 | 8.11940E−05 | — | −5.41305E−06 |

The content of Table 6-3 may be deduced from Table 6-1.

TABLE 6-3

Embodiment 5

| f (mm) | 5.54 | $(R_7 + R_8)/(R_7 − R_8)$ | −6.88 |
|---|---|---|---|
| Ape. Stop | 2.95 | $f/f_1$ | 1.67 |
| HFOV(deg.) | 32.0 | $f/f_2$ | −0.95 |
| $V_1 − V_2$ | 34.5 | $f/f_4$ | −0.41 |
| $T_{12}/T_{23}$ | 0.72 | $f/f_3 + f/f_4 + f/f_5$ | 0.00 |
| $(R_3 + R_4)/(R_3 − R_4)$ | 0.90 | TTL/ImgH | 1.67 |

Figures 6B, 6C, 6D:
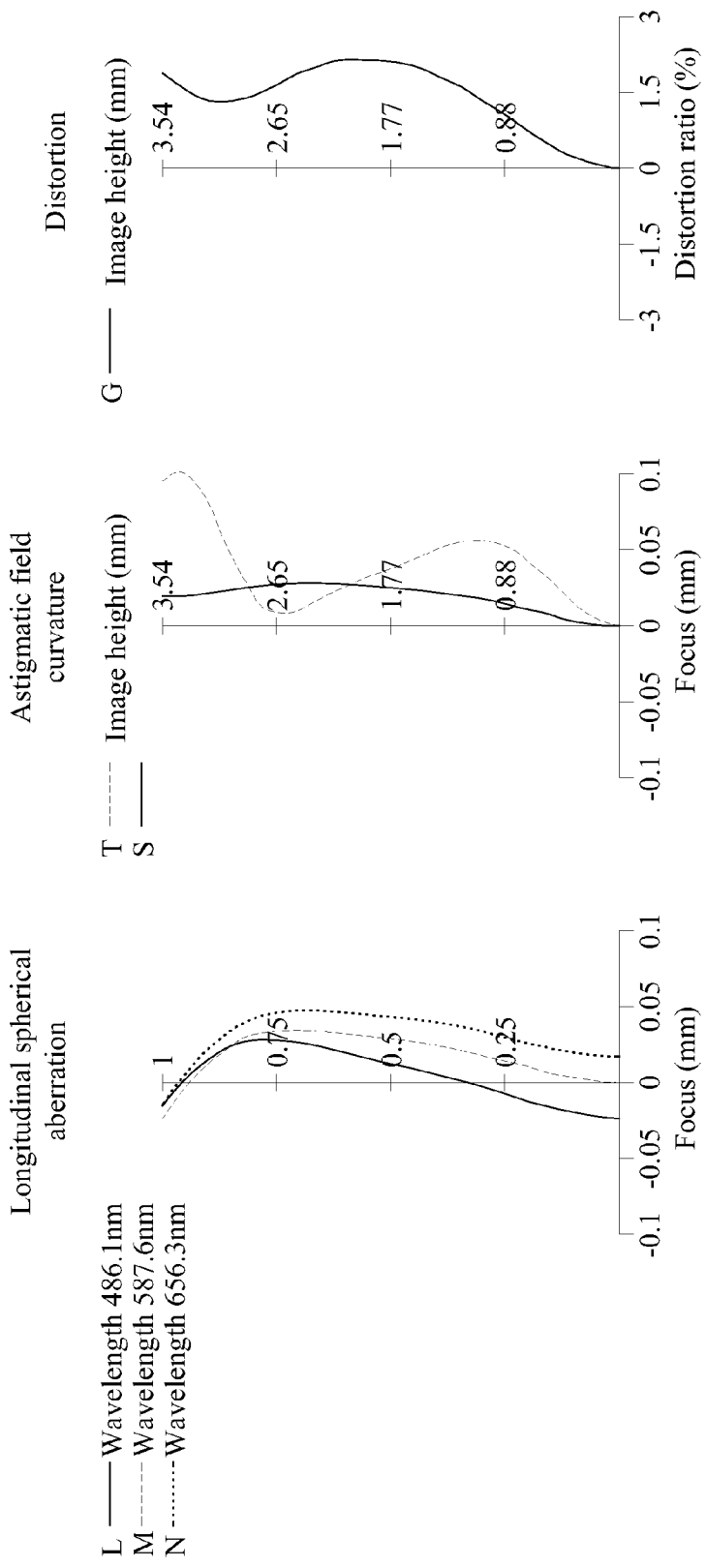
FIG. 6B is a graph of longitudinal spherical aberration curves when the lights having wavelengths of 486.1 nm, 587.6 nm, and 656.3 nm are respectively projected in the photographing optical lens assembly in FIG. 6A.
FIG. 6C is a graph of astigmatic field curves when the light having the wavelength of 587.6 nm is projected in the photographing optical lens assembly in FIG. 6A.
FIG. 6D is a graph of a distortion curve when the light having the wavelength of 587.6 nm is projected in the photographing optical lens assembly in FIG. 6A.

FIG. 6B is a graph of longitudinal spherical aberration curves when the lights having wavelengths of 486.1 nm, 587.6 nm, and 656.3 nm are respectively projected in the photographing optical lens assembly 60 in FIG. 6A. It can be observed from FIG. 6B that the longitudinal spherical aberrations generated by the photographing optical lens assembly 60 are within a range of −0.04 mm to 0.05 mm regardless of the wavelengths of the lights.

FIG. 6C is a graph of astigmatic field curves when the lights having wavelengths of 486.1 nm, 587.6 nm, and 656.3 nm are respectively projected in the photographing optical lens assembly 60 in FIG. 6A. It can be observed from FIG. 6C that the astigmatic field curvature of the tangential plane is within a range of 0 mm to 0.11 mm, and the astigmatic field curvature of the sagittal plane is within a range of 0 mm to 0.05 mm.

FIG. 6D is a graph of a distortion curve when the lights having wavelengths of 486.1 nm, 587.6 nm, and 656.3 nm are respectively projected in the photographing optical lens assembly 60 in FIG. 6. It can be observed from FIG. 6D that the distortion ratio is within a range of 0% to 3%. As shown in FIGS. 6B to 6D, the photographing optical lens assembly 60, designed according to the sixth embodiment, is capable of effectively correcting various aberrations.

What is claimed is:

1. A photographing optical lens assembly comprising, in order from an object side to an image side:

a first lens element with positive refractive power;

a second lens element with negative refractive power having a concave object-side surface and a concave image-side surface;

a third lens element with positive refractive power having a concave object-side surface and a convex image-side surface, the object-side surface and the image-side surface of the third lens element being aspheric, and the third lens element being made of plastic;

a fourth lens element with negative refractive power having a concave object-side surface and a convex image-side surface, the object-side surface and the image-side surface of the fourth lens element being aspheric, and the fourth lens element being made of plastic; and a fifth lens element, the object-side surface and the image-side surface of the fifth lens element being aspheric, and the fifth lens element being made of plastic;

an air distance existing between the first lens element and the second lens element, the photographing optical lens assembly satisfying the following condition:

$$-1.4 < f/f_2 < -0.3$$

$$-1.5 < f/f_4 < -0.2$$

$$-0.6 < (R_3 + R_4)/(R_3 − R_4) < 1.0$$

wherein f is the focal length of the photographing optical lens assembly; $f_2$ is the focal length of the second lens element; $f_4$ is the focal length of the fourth lens element; $R_3$ is the curvature radius of the object-side surface of the second lens element; $R_4$ is the curvature radius of the image-side surface of the second lens element.

2. The photographing optical lens assembly according to claim 1, wherein the object-side surface of the first lens element is convex and the image-side surface of the fifth lens element is concave.

3. The photographing optical lens assembly according to claim 2, wherein the fifth lens element has an inflection point.

4. The photographing optical lens assembly according to claim 3, wherein the photographing optical lens assembly satisfies the following condition:

$$1.2 < f/f_1 < 2.0$$

wherein $f_1$ is the focal length of the first lens element.

5. The photographing optical lens assembly according to claim 3, wherein the photographing optical lens assembly satisfies the following condition:

$$20 < V_1 - V_2 < 45$$

wherein, $V_1$ is the Abbe number of the first lens element, and $V_2$ is the Abbe number of the second lens element.

6. The photographing optical lens assembly according to claim 5, wherein the photographing optical lens assembly satisfies the following condition:

$$30 < V_1 - V_2 < 42.$$

7. The photographing optical lens assembly according to claim 3, wherein the photographing optical lens assembly satisfies the following condition:

$$-0.6 < f/f_4 < -0.2$$

8. The photographing optical lens assembly according to claim 3, wherein the photographing optical lens assembly satisfies the following condition:

$$0 < T_{12}/T_{23} < 0.5$$

wherein $T_{12}$ is the axial distance between the first lens element and the second lens element; $T_{23}$ is the axial distance between the second lens element and the third lens element.

9. The photographing optical lens assembly according to claim 3, wherein the photographing optical lens assembly satisfies the following condition:

$$0 < (R_3 + R_4)/(R_3 - R_4) < 1.0.$$

10. The photographing optical lens assembly according to claim 9, wherein the photographing optical lens assembly satisfies the following condition:

$$-0.5 < f/f_3 + f/f_4 + f/f_5 < 0.3$$

wherein $f_3$ is the focal length of the third lens element; $f_5$ is the focal length of the fifth lens element.

11. The photographing optical lens assembly according to claim 9, wherein the photographing optical lens assembly satisfies the following condition:

$$-7.5 < (R_7 + R_8)/(R_7 - R_8) < -3.0$$

wherein $R_7$ is the curvature radius of the object-side surface of the fourth lens element, and $R_8$ is the curvature radius of the image-side surface of the fourth lens element.

12. The photographing optical lens assembly according to claim 3, further comprising an image sensor disposed on an image plane, and the photographing optical lens assembly satisfying the following condition:

$$TTL/ImgH < 2.1$$

wherein TTL is the axial distance between the object-side surface of the first lens element and the image plane; ImgH is a half of the diagonal length of the effective photosensitive area of the image sensor.

13. A photographing optical lens assembly comprising, in order from an object side to an image side:
a first lens element with positive refractive power;
a second lens element with negative refractive power having a concave object-side surface and a concave image-side surface;
a third lens element having a concave object-side surface and a convex image-side surface, the object-side surface and the image-side surface of the third lens element being aspheric, and the third lens element being made of plastic;
a fourth lens element with negative refractive power having a concave object-side surface and a convex image-side surface, the object-side surface and the image-side surface of the fourth lens element being aspheric, and the fourth lens element being made of plastic; and
a fifth lens element, the object-side surface and the image-side surface of the fifth lens element being aspheric, and the fifth lens element being made of plastic;
an air distance existing between the first lens element and the second lens element, the photographing optical lens assembly satisfying the following condition:

$$-1.5 < f/f_4 < -0.2$$

$$-14.0 < (R_7 + R_8)/(R_7 - R_8) < -2.0$$

$$0 < T_{12}/T_{23} < 1.4$$

$$20 < V_1 - V_2 < 45$$

wherein f is the focal length of the photographing optical lens assembly; $f_4$ is the focal length of the fourth lens element; $R_7$ is the curvature radius of the object-side surface of the fourth lens element; $R_8$ is the curvature radius of the image-side surface of the fourth lens element; $T_{12}$ is the axial distance between the first lens element and the second lens element; $T_{23}$ is the axial distance between the second lens element and the third lens element; $V_1$ is the Abbe number of the first lens element, and $V_2$ is the Abbe number of the second lens element.

14. The photographing optical lens assembly according to claim 13, wherein the object-side surface of the first lens element is convex, the image-side surface of the fifth lens element is concave, and the fifth lens element has an inflection point.

15. The photographing optical lens assembly according to claim 14, wherein the photographing optical lens assembly satisfying the following condition:

$$1.2 < f/f_1 < 2.0$$

wherein $f_1$ is the focal length of the first lens element.

16. The photographing optical lens assembly according to claim 14, wherein the photographing optical lens assembly satisfying the following condition:

$$-0.6 < f/f_4 < -0.2.$$

17. The photographing optical lens assembly according to claim 15, wherein the photographing optical lens assembly satisfies the following condition:

$$0 < (R_3 + R_4)/(R_3 - R_4) < 1.0$$

wherein $R_3$ is the curvature radius of the object-side surface of the second lens element; $R_4$ is the curvature radius of the image-side surface of the second lens element.

18. The photographing optical lens assembly according to claim 15, wherein the photographing optical lens assembly satisfies the following conditions:

$$0 < T_{12}/T_{23} < 0.5.$$

19. The photographing optical lens assembly according to claim 15, wherein the photographing optical lens assembly satisfies the following conditions:

$$-0.5 < f/f_3 + f/f_4 + f/f_5 < 0.3$$

wherein $f_3$ is the focal length of the third lens element; $f_5$ is the focal length of the fifth lens element.

* * * * *